United States Patent
Arthur et al.

(10) Patent No.: US 12,181,862 B2
(45) Date of Patent: Dec. 31, 2024

(54) AUTOMATED VEHICLE REPAIR SYSTEM

(71) Applicant: 3M INNOVATIVE PROPERTIES COMPANY, St. Paul, MN (US)

(72) Inventors: Jonathan B. Arthur, Hudson, WI (US); Brett R. Hemes, Woodbury, MN (US); Thomas J. Strey, River Falls, WI (US); John J. Schmidt, Stillwater, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 316 days.

(21) Appl. No.: 17/755,023

(22) PCT Filed: Oct. 20, 2020

(86) PCT No.: PCT/IB2020/059851
§ 371 (c)(1),
(2) Date: Apr. 19, 2022

(87) PCT Pub. No.: WO2021/084381
PCT Pub. Date: May 6, 2021

(65) Prior Publication Data
US 2022/0382262 A1 Dec. 1, 2022

Related U.S. Application Data

(60) Provisional application No. 62/926,819, filed on Oct. 28, 2019.

(51) Int. Cl.
*G05B 19/418* (2006.01)
*G06T 7/00* (2017.01)
(52) U.S. Cl.
CPC ... *G05B 19/41875* (2013.01); *G05B 19/4183* (2013.01); *G06T 7/0004* (2013.01)

(58) Field of Classification Search
CPC .......... G05B 19/4183; G05B 19/41875; G06T 7/0004
(Continued)

(56) References Cited

U.S. PATENT DOCUMENTS 8,510,196 B1 * 8/2013 Brandmaier ........... G06Q 40/08
705/35
9,886,771 B1 * 2/2018 Chen ................... G06F 3/04845
(Continued)

FOREIGN PATENT DOCUMENTS

CA       3041590 A1 *  7/2018 ......... G01B 11/2513
CN    113490960 A  * 10/2021 ........... G06Q 30/016
(Continued)

OTHER PUBLICATIONS

Atzmueller, "Big Data Analytics In The Social And Ubiquitous Context: 5th International Workshop OniModeling Social Media, Msm 2014, 5th International Workshop On Mining Ubiquitous And Social Environments, Muse 2014", (2016). XP047446549.
(Continued)

Primary Examiner — Ronald D Hartman, Jr.

(57) ABSTRACT

A defect detection and ranking system for a vehicle assembly line is provided. The system includes an image capture device that captures a plurality of images of a vehicle on the vehicle assembly line. The system also includes a defect detector that analyzes the plurality of captured images and, based on the analysis, detects a plurality of defects on the surface of the vehicle. Each of the plurality of defects has an associated x-y-z coordinate location, a defect type, and a defect severity. The system also includes a datastore containing a vehicle specification, for the vehicle on the vehicle assembly line, and a defect priority based on the vehicle specification. The system also includes a defect prioritization generator configured to: receive the plurality of defects from the defect detector, retrieve the vehicle specification
(Continued)

and the defect priority, and apply the defect priority to the plurality of defects, and output a prioritized list of defects, wherein the prioritized list of defects. The defect prioritization generator outputs the prioritized list of defects to an output device associated with the vehicle assembly line.

20 Claims, 15 Drawing Sheets

(58) Field of Classification Search
USPC .......................................................... 700/95
See application file for complete search history.

(56) References Cited

U.S. PATENT DOCUMENTS

| | | | |
|---|---|---|---|
| 2001/0001573 A1 | 5/2001 | Haga et al. | |
| 2002/0171826 A1 | 11/2002 | Wiles et al. | |
| 2003/0139836 A1 | 7/2003 | Matthews et al. | |
| 2005/0251303 A1* | 11/2005 | Tsubota | B62D 65/005 |
| | | | 701/29.3 |
| 2012/0297337 A1* | 11/2012 | St. Denis | G06Q 30/0613 |
| | | | 705/305 |
| 2017/0148102 A1* | 5/2017 | Franke | G06Q 30/0601 |
| 2017/0277979 A1 | 9/2017 | Allen et al. | |
| 2019/0096057 A1 | 3/2019 | Allen et al. | |
| 2019/0238796 A1 | 8/2019 | Allen et al. | |
| 2020/0111061 A1* | 4/2020 | Stucki | G06V 10/764 |

FOREIGN PATENT DOCUMENTS

| | | | | |
|---|---|---|---|---|
| EP | 0874213 | B1 | 3/2004 | |
| EP | 4052197 | A1 * | 9/2022 | ......... G05B 19/4183 |
| FR | 2896899 | B1 | 6/2008 | |
| JP | 040331360 | A | 11/1992 | |
| JP | 07027709 | A | 1/1995 | |
| JP | 11118730 | A * | 4/1999 | |
| JP | 11295235 | A | 10/1999 | |
| JP | 3211681 | B2 * | 9/2001 | ......... G01N 21/8806 |
| JP | 2008310535 | A * | 12/2008 | |
| JP | 4286605 | B2 * | 7/2009 | |
| JP | 2012122964 | A | 6/2012 | |
| WO | 2015197868 | A1 | 12/2015 | |
| WO | WO-2020247906 | A1 * | 12/2020 | ............ G03B 15/06 |
| WO | WO-2021176385 | A1 * | 9/2021 | |

OTHER PUBLICATIONS

International Search Report for PCT Application No. PCT/IB2020/059851 mailed on Jan. 29, 2021, 5 pages.

Prabuwono, "Surface Defects classification using Artificial Neural Networks in Vision Based Polishing Robot", International Conference on Intelligent Robotics and Applications (ICIRA), Intelligent Robotics and Applications, 2011, vol. 7102, No. 2, pp. 599-608.

* cited by examiner

Make: Honda            Market: Japan
Model: CR-V            City  : Tokyo
Color: Silver 1) Trunk Scratch Defect 1              Severe
2) Driver Door Dent Defect             Severe
3) Trunk Scratch Defect 2              Moderate
4) Rear Passenger Door Haze            Moderate
5) Front Grill Scratch Defect          Moderate
6) Trunk Irregular Surface Defect      Moderate
7) Passenger Door Defect               Moderate Recommend : On-Site Repair

AUTOMATED VEHICLE REPAIR SYSTEM

CROSS REFERENCE TO RELATED APPLICATIONS

This application is a national stage filing under 35 U.S.C. 371 of PCT/IB2020/059851, filed Oct. 20, 2020, which claims the benefit of U.S. Provisional Application No. 62/926,819, filed Oct. 28, 2019, the disclosure of which is incorporated by reference in its/their entirety herein.

BACKGROUND

Many different types of vehicles are manufactured each year around the world. Vehicles such as cars, trucks, train cars and planes often have one or more coats of paint and clear coat applied during the manufacturing process. The process of correcting defects that occur in the paint process is often a time-consuming manual task.

SUMMARY

A defect detection and ranking system for a vehicle assembly line is provided. The system includes an image capture device that captures a plurality of images of a vehicle on the vehicle assembly line. The system also includes a defect detector that analyzes the plurality of captured images and, based on the analysis, detects a plurality of defects on the surface of the vehicle. Each of the plurality of defects has an associated x-y-z coordinate location, a defect type, and a defect severity. The system also includes a datastore containing a vehicle specification, for the vehicle on the vehicle assembly line, and a defect priority based on the vehicle specification. The system also includes a defect prioritization generator configured to: receive the plurality of defects from the defect detector, retrieve the vehicle specification and the defect priority, and apply the defect priority to the plurality of defects, and output a prioritized list of defects, wherein the prioritized list of defects. The defect prioritization generator outputs the prioritized list of defects to an output device associated with the vehicle assembly line

BRIEF DESCRIPTION OF THE DRAWINGS

FIG. 8 is an example user interface for a vehicle repair system.

FIGS. 13-16 illustrate defects and example feedback as discussed in greater detail in the Examples.

Structural changes to the examples set forth in this disclosure may be made without departing from the scope of the techniques of this disclosure. The figures are not necessarily to scale. Like numbers used in the figures refer to like components. However, the use of a number to refer to a component in a given figure is not intended to limit the component in another figure labeled with the same number.

DETAILED DESCRIPTION

Automation of the vehicle manufacturing process has been underway for decades. The vehicle manufacturing industry has started introducing of robotics to replace manual labor previously done by human workers. Automation can increase efficiency of the manufacturing process and reduce workplace accidents by using robots to accomplish difficult, dangerous, or time-consuming tasks. Robotics can also improve precision and reduce waste.

However, one area that has proven difficult to automate is the repair of defects, particularly surface defects that may be caused, or exaggerated, during the painting process. As will be described in greater depth with respect to the figures, a vehicle often receives several coats of paint—including potentially several coats of primer, color, and clear coats. Defects on the surface of the vehicle can be caused by contaminants, clumping and flow issues and drying irregularities in the painting process.

Purchasers of vehicles have aesthetic standards that a potential vehicle must meet. For example, a person shopping for a new car will look to ensure the car does not appear to have scratches, dents or other defects. Significant time and effort goes into reviewing a car for, and repairing any detected defects before it leaves the manufacturing facility.

Examples described herein describe the defect detection and repair process as it applies to manufacture of automobiles, such as cars and trucks. However, it is expressly contemplated that many embodiments described herein are equally applicable to other vehicles such as boats and other watercraft, train cars and engines, airplanes and other flying vehicles, rockets, etc.

As used herein, the term 'paint' is intended to include primers, pigment layers, clear coats, as well as any other coatings that may be applied to a car.

As used herein, the term 'defect' is intended to refer to any defect that may be present on a vehicle after a painting process. For example, defects may include, but are not limited to, scratches, dents, debris trapped within a paint coat, excess or unevenly applied paint, haze, inconsistent gloss or other surface-based defects.

Figure 1:
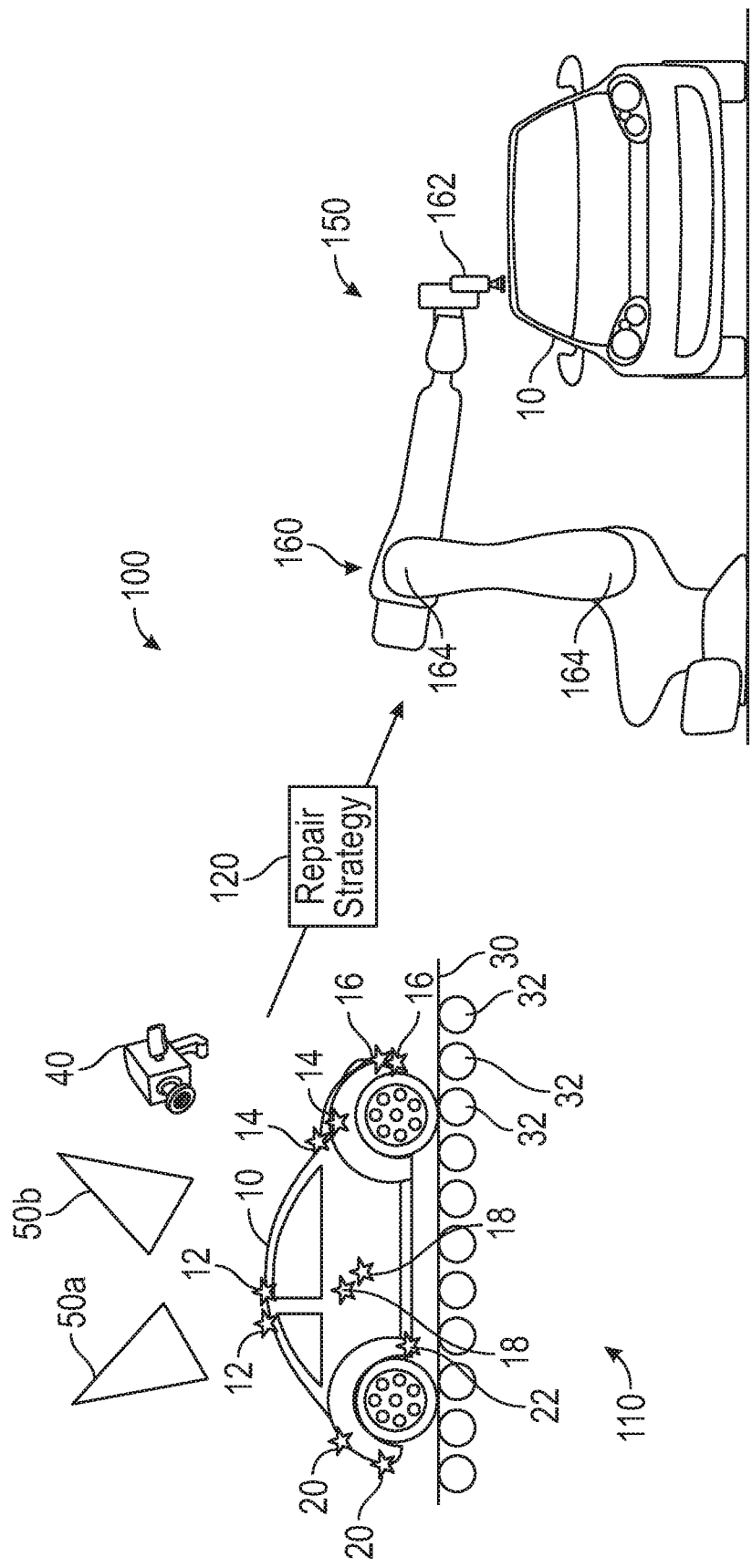
FIG. 1 is a conceptual diagram of a manufacturing environment for detecting and correcting defects on a vehicle surface.

FIG. 1 is a conceptual diagram illustrating an example manufacturing environment for detecting and correcting defects on a vehicle surface. In manufacturing environment 100, a vehicle 10 is first inspected for defects at station 110 and, after a repair strategy is generated, sent for repair at station 150. In many manufacturing environments, stations 110 and 150 are sequential, such that defects are identified and then repaired. However, in some embodiments these steps may occur at least partially simultaneously.

Vehicle 10, after the painting process, has a plurality of defects 20, 12, 14, 16, 22, and 18. Depending on the manufacturing facility, there may be more or fewer defects, and defects may be located in different locations and be of different types and severity.

Each defect on vehicle 10 has a defect type (e.g. scratch or dent) and a severity (e.g. severe or minor). The defect also has a location on vehicle 10. Depending on the type of vehicle 10, different defects may be more or less important depending on their type, severity and location. For example, on a small car 10, defects 18 near a door handle, are much more likely to be a problem for a potential customer than defects 12 on the roof of car 10 or defects 16 below a front bumper.

There is a limited amount of time available during manufacture to detect and repair defects. If more defects are detected than can be timely repaired, vehicle 10 may need to be diverted for repair, instead of being repaired during assembly.

As illustrated in FIG. 1, a defect detection station 110 includes a vision system with one or more cameras 40 and one or more light sources 50$a$, $b$, etc. Vision systems operate by detecting, and subsequently mapping, irregularities in the surface of vehicle 10. In some embodiments, defect detection station 110 is part of a moving assembly line, as illustrated by conveyor belt 30 and conveyance mechanisms 32. However, in other embodiments, defect detection station 110 includes vehicle 10 in a stationary position.

Defect detection systems are known in the art. For example, US Patent Application Publications 2019/0096057, filed on May 9, 2018, and 2017/0277979, filed on Mar. 22, 2016, both owned by Innovision Software Solutions Inc., describe some example defect detection systems.

Once defects are identified, they are repaired at repair station 150. Repair station 150 may include a robot 160 which may move using joints 164. Abrasive material may be applied to a vehicle using an applicator 162.

However, while a robot 160 is illustrated as accomplishing repairs in FIG. 1, often the repair strategy is formulated by a human operator. Often, at least some of the repairs are also done by a human. However, human operators may introduce bias into the repair process. For example, a human operator may prefer to start at the front of a vehicle, e.g. repairing defects 16, and end at the back, by repairing defects 20 last. Similarly, the human operator may preferentially select to repair defects 12, at the top of a vehicle, before defects 18 or 22.

Using a robotic repair system 160 may also provide benefits over a human repair technician. Robotic repair system 160 uses a coordinate-based location system, provided from defect detection station 110 to approach and repair a defect. Humans rely on sight to locate a defect. However, when an abrasive pad with polish or other abrasive material is applied, the defect may no longer be visible to the human eye. Robot repair system 160 does not require a sightline of the defect during the repair, instead relying on coordinates to ensure that the repair is conducted at the right spot. This results in more reliable repair, and often a smaller repair area since robot 160 is more precise.

During manufacture of vehicles, time is of the essence, and selecting which defects to repair, and which to leave as-is, can make the difference between a vehicle being declared ready for sale or not.

Innovation is needed in determining a repair strategy 120 for repair of detected defects on a vehicle surface. The repair strategy needs to take into account known information about vehicle 10 (make, model, color, and paint application parameters) as well as information about the detected defects (number, location, severity), and the destination market (country, dealership, potential customer) to determine which defects should be repaired, and in what order. The system may also make recommendations or provide instructions for a robotic repair system 160 regarding which abrasive products to use to repair a defect.

Figure 2:
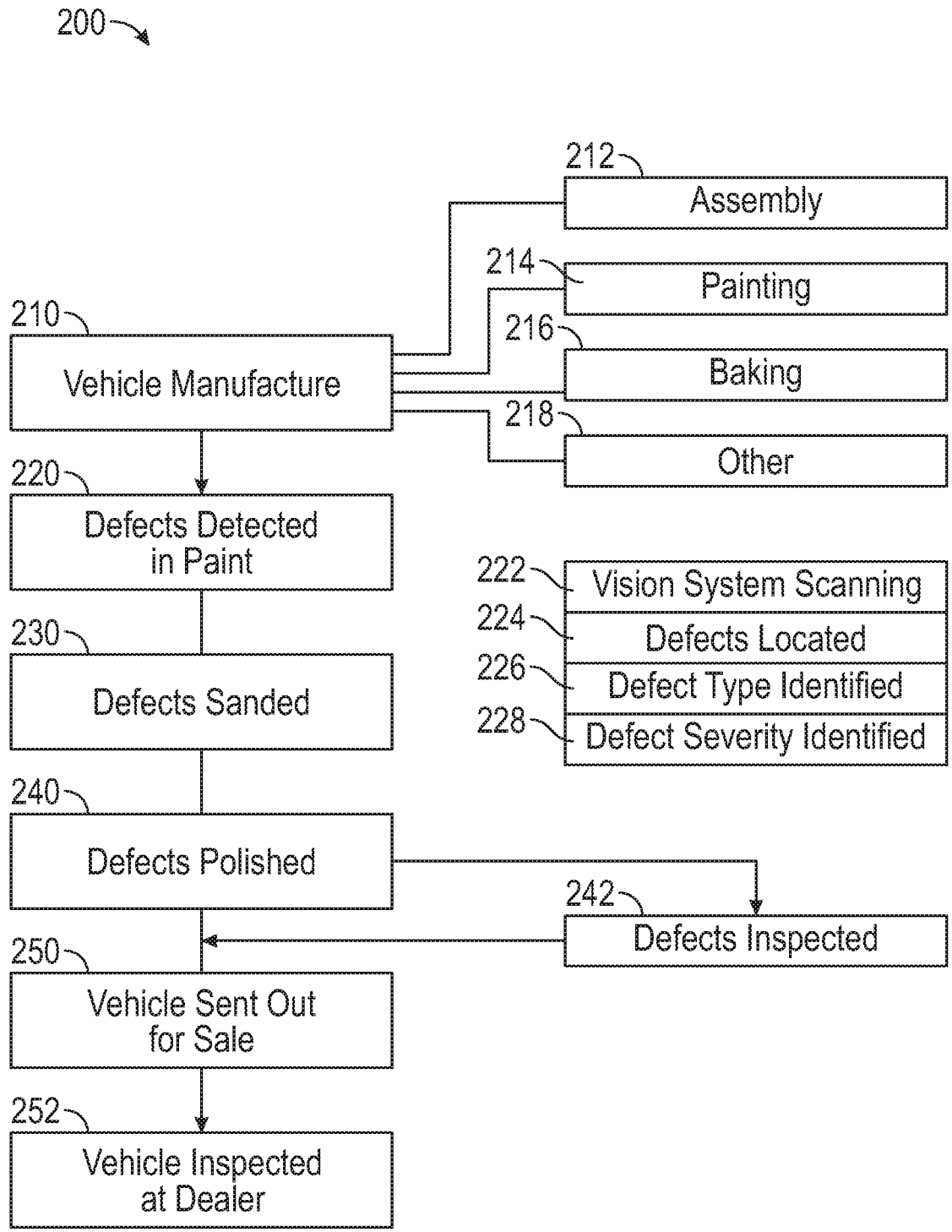
FIG. 2 is a block diagram of a method of defect detection and repair in a manufacturing environment.

FIG. 2 is a block diagram of a method of defect detection and repair in which embodiments of the present invention may be useful. Method 200 is applicable to a wide variety of vehicles including cars, trucks, boats, airplanes, trains, helicopters, etc.

In block 210, a vehicle is manufactured. Manufacture includes structural assembly 212 of vehicle. Manufacture also includes one or more applications of paint 214. After paint is applied, the vehicle undergoes a baking process 216 to facilitate even paint drying. The movement between painting and baking stations can result in the introduction of dust or other debris onto vehicle surface, which may result in a defect. Additionally, the vehicle may be scratched or dented during assembly 212, painting 214 or baking 216. Paint may also be applied unevenly resulting in excess paint accumulation in some areas, inconsistent surfaces, haze, or inconsistent glaze.

In block 220, defects are detected. Defect detection systems often include one or more light sources that illuminate the vehicle. A scanning system is also included, as indicated in block 222. The scanning system detects defects in the paint surface and determines a location of each defect, as indicated in block 224. A type is identified for each defect, as indicated in block 226. For example, a defect may be identified as a dent, a scratch, or excess paint on the surface, for example. The defect may also be identified as a raised surface, e.g. excess paint or debris captured in the paint, or a depressed surface, such as a dent or a scratch. In some embodiments, a location of a defect includes a coordinate location of the identified defect on the vehicle as well as an area affected. For example, a small piece of debris may only affect a square centimeter of paint while a larger piece of debris may cause a square inch to be affected. Defects are also classified as having a severity 228.

In blocks 230 and 240, identified defects are repaired. Traditionally, defects are repaired by human repair technicians. The identified defects are provided from the vision system to the technicians, who decide which defects to fix based on the printout and a visual inspection. Often, based on the visual inspection, a determination will be made as to whether the vehicle can be repaired during the assembly process, or whether the vehicle needs to be diverted for a more intensive repair. Diversion results in a longer assembly time for a vehicle and more man-hours, resulting in higher cost. Systems and methods described herein are designed to increase efficiency of a repair process. Additionally, systems and methods designed herein also facilitate use of robotic repair systems, which increase accuracy of repair, reduce the amount of repair products needed, and reduce overall repair time.

In block 230, a defect is sanded, often using an abrasive product combined with water, polish or another fluid. Before or after sanding the defect area may be washed. After water or another fluid is applied, the defect area may be wiped dry.

In block 240, the sanded defect is polished. Polishing may include using an abrasive or non-abrasive product combined with water, polish or another fluid. Before or after polishing the defect area may be washed or wiped dry. After polishing, as indicated in block 242, the repaired defects may be inspected. This may take place as part of a repair validation process.

In block 250, the vehicle is sent out from the assembly process for sale. This often involves shipping the vehicle across state, or country lines, to a dealership. When the vehicle arrives at a dealership, it is often inspected again, as indicated in block 252. Because of the anticipated inspection at a point of sale, the choice of which defects to repair during blocks 230 and 240 is important to ensure that the vehicle is not rejected from the dealership.

Figure 3:
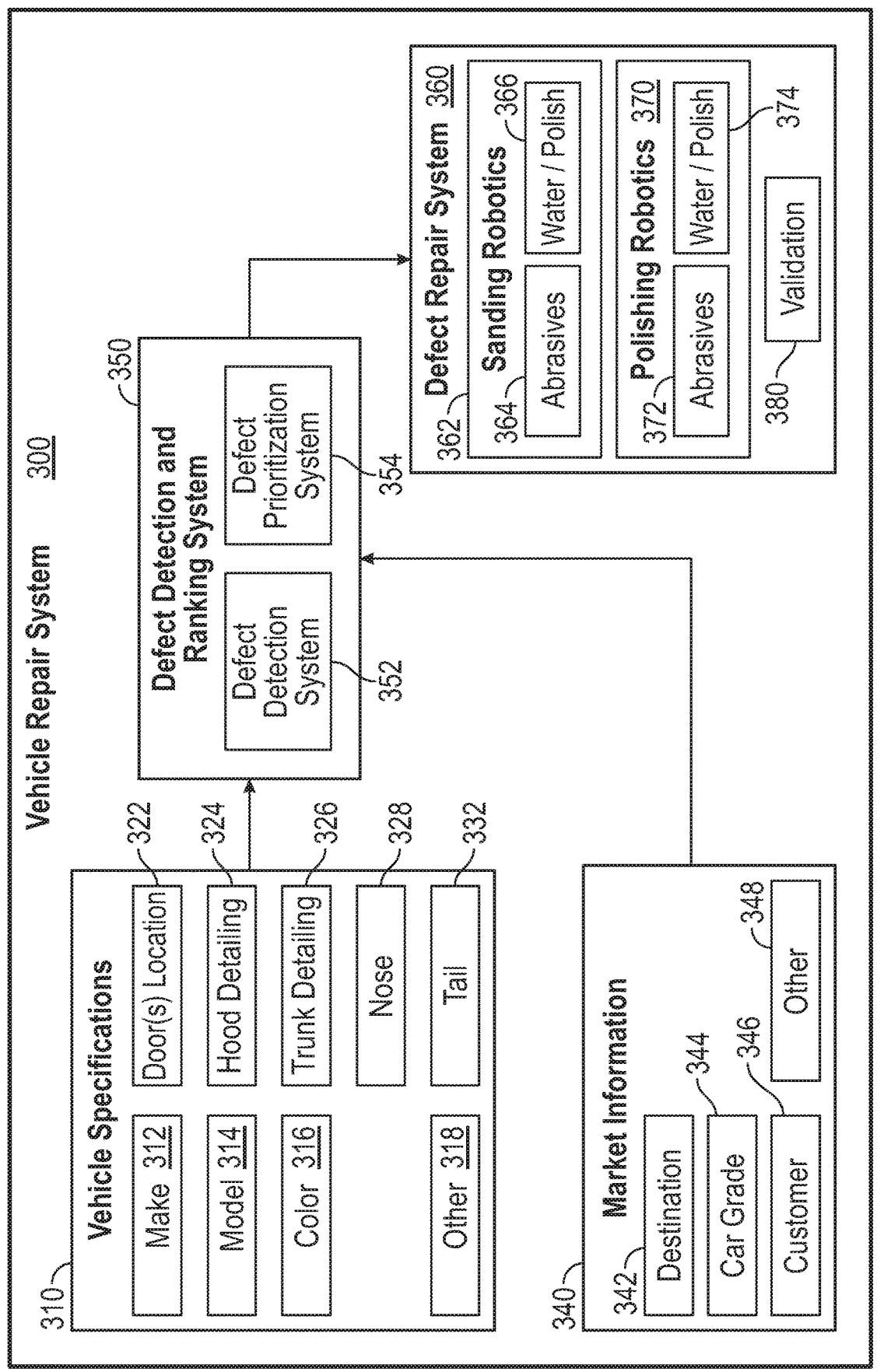
FIG. 3 is a block diagram showing a vehicle repair system.

FIG. 3 is a block diagram showing a vehicle repair system. Vehicle repair system 300 may be implemented as part of a vehicle assembly and manufacturing system, in some embodiments.

Vehicle specifications 310 may be stored in a datastore, in one embodiment. Vehicle specifications are available for a vehicle currently being evaluated by the defect detection and ranking system 350. Vehicle specifications include, for example, a vehicle make 312, model 314, and color 316. For example, a black Honda® CR-V® may be on an assembly line. The vehicle may have certain specifications, e.g. a number of doors and their locations 322 (such as a 2-door or a 4-door model of a car or truck). Different automobiles may have different hood detailing 324 or trunk detailing 326. For example, for aesthetic reasons as well as aerodynamic reasons, different car makes and models have differently designed hoods with different contours. However, while many examples described herein refer to cars and trucks, many embodiments are equally applicable to other vehicle types. For example, an airplane or helicopter has specifications concerning nose design 328 and tail design 332. Other specifications 318 may also be available for a given vehicle.

Defect detection and ranking system 350 includes a defect detection system 352 and a defect prioritization system 352. System 350 receives vehicle specifications 310 and, at least based on some vehicle specifications, and defects detected b defect detection system 352, defect prioritization system provides a prioritized set of defects for repair to defect repair system 360.

For at least some vehicles, market information 340 may also be important for prioritization system 354. Market information may include final destination 342, car grade 344, customer 346, or other information. For example, cars destined for the Japanese or European market may need to have fewer untreated defects in order to be deemed acceptable by a dealer. Cars with a higher car grade 344 may also have a higher standard for repaired defects as well as fewer, if any, untreated defects. For example, a Lamborghini™ is considered a higher car grade than a Ford™ Ranger™. Customer information may also be available and important for prioritizing defects. For example, customers in the Japanese market are generally shorter than those in the American market. Therefore, cars destined for different markets may have different defect prioritization depending on a prospective customer's eyesight range.

Defect detection system 352 is configured to detect a series of defects related to a vehicle. Defect detection system 352 is configured to detect defects using a vision system. Defect detection system 352 outputs a series of defects to defect prioritization system 354. Each of the defects in the series of defects is associated with a defect type, defect location, and defect severity.

Defect prioritization system 354 receives the series of defects and, based on at least some of specifications 310 market information 340, orders the defects for repair. Defect prioritization system 354 may also make a determination regarding which defects should be repaired, and which left unrepaired. Defect prioritization system may also provide a recommendation as to whether a vehicle should be repaired as part of the assembly line process, or whether it should be diverted for a separate repair process. Diversion may be automatically recommended, for example, based on a defect threshold, such as a detected length of a scratch or size of trapped debris. Diversion may also be recommended based on a number of defects, a number of a type of defects, or another threshold.

Depending on vehicle specifications 310 and marketing information 340, defect prioritization system 354 will generate a defect repair list, or defect repair order, that ranks defects differently depending on retrieved specifications. For example, for taller cars, defects on a roof are a low priority. For silver cars, scratches are less noticeable, and lower priority, than scratches on red cars. On a black surface, such as the hood or trunk of a black car, all surface defects are more noticeable and a higher priority to repair. Defects on a driver door, specifically around the handle, are a higher priority than those elsewhere on the vehicle. Defects may be lower priority if they are below an exterior trim line than if they are above it. Defects on the hood of a clear coated jet-black painted sedan may be much more visible than the same defect on a hood on the exact same car that is white. Defects that are at the bottom of the vehicle on a truck can be much more easily accepted than the same defect on a car because of the perceived purpose and durability and rough expected life of the truck.

Defect detection and ranking system 350 is also in communication, in some embodiments, with a defect repair system 360. Defect repair system 360 may be a robotic repair system, in some embodiments. Information about performance of robotic repair units, such as time to repair a given defect and time to move between defects, may also be considered by defect prioritization system 354 when creating a defect repair plan. Defect repair system may have sanding robotics 362, which include an abrasive applicator 364 and a dispenser 366 for water and/or polish. Defect repair system may also have polishing robotics 370, with an abrasive applicator 372 and a fluid dispenser 374 for water and/or polish. Sanding robotics 362 and polishing robotics 370 may be separate robotic systems or part of one robotic repair system. Defect repair system 360 may also have a validation system 380 that may inspect repaired defects for quality.

Figure 4:
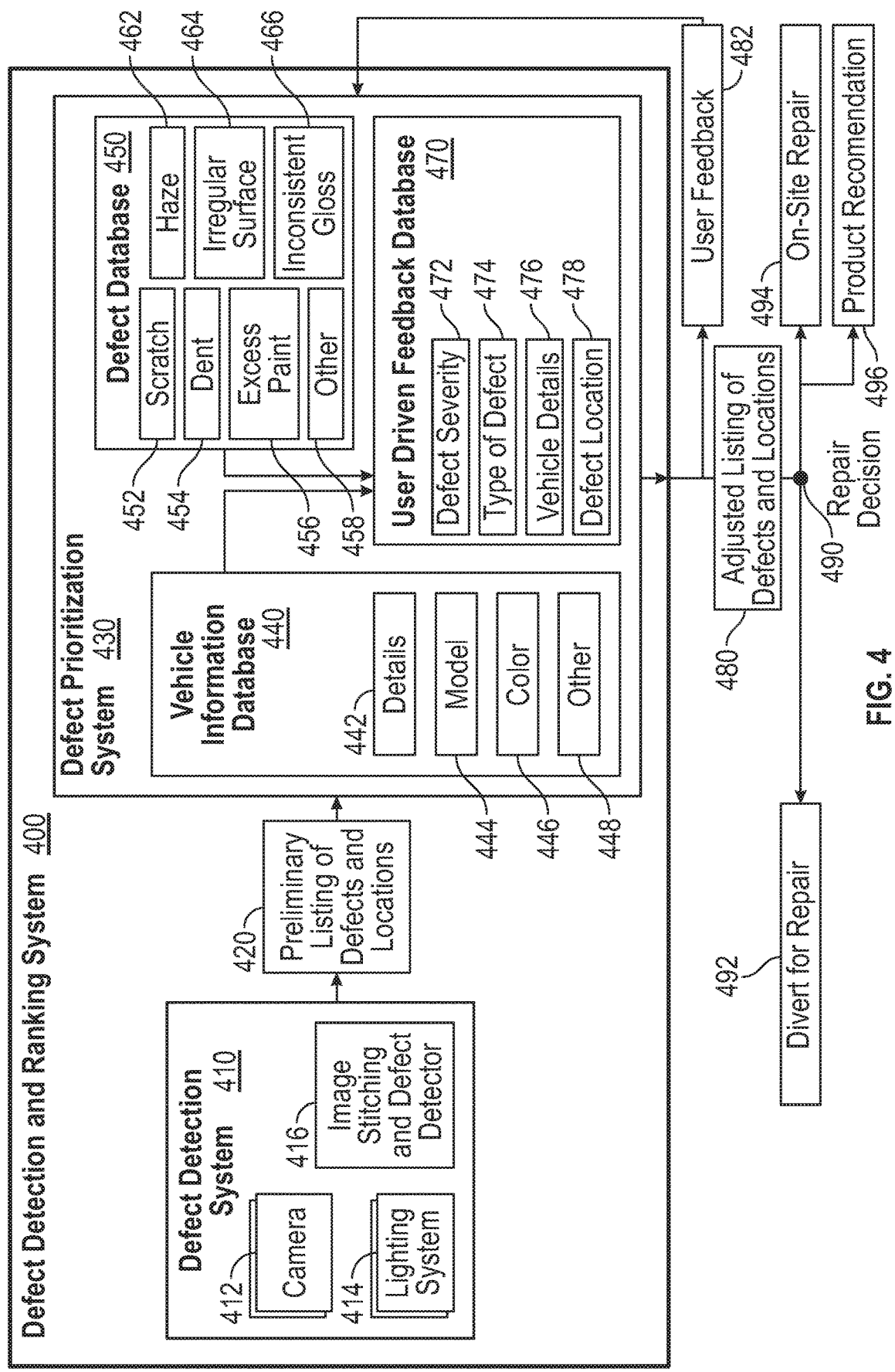
FIG. 4 is a block diagram of a defect detection and ranking system.

FIG. 4 is a block diagram of a defect detection and ranking system. Defect detection and ranking system 400 is similar to defect detection and ranking system 350 of FIG. 3. Defect detection and ranking system includes a defect detection system 410, which outputs a preliminary list of defects and locations 420, and a defect prioritization system 430, which outputs a prioritize listing of defects and locations 480.

Defect detection system 410 includes one or more cameras 412, one or more lighting systems 414, and an image stitching and defect detection system 416. Lighting system 414 illuminates a portion of a vehicle while camera 412 captures image or video of the vehicle. Imaging stitching and defect detector 416 includes a processor that reviews captured images or video and detects defects on the imaged surface of a vehicle. Reviewing may include stitching images together in some embodiments.

Detected defects are output from defect detection system 410 as a listing of defects 420. The preliminary list of defects includes, for each defect, a location classification and severity. Defect detector 416 may output a location in a coordinate system format. The coordinate system format of preliminary defect listing 420 may be provided to a repair system 494 for eventual repair.

Defect prioritization system 430 receives preliminary defect list 420. Defect prioritization system uses information stored in vehicle information database 440, defect database 450 and feedback database 470 to evaluate and prioritize preliminary defect list 420.

Vehicle information database 440 includes information about a vehicle being evaluated. The given vehicle has a model 444, color 446, detail specifications 442 and other features 448.

Defect database 450 includes defects identified in the preliminary listing of defects 420. Many different types of surface defects can be identified and repaired using identification and repair systems. Some examples of defects that can be identified using defect detection system 410 include scratches 452, dents 454, excess paint 456, haze 462, irregular surface 464, inconsistent gloss 466, or other defects 458.

Defect detection and ranking system 400, in some embodiments, includes some machine learning functionality, such that the generated repair strategy can be improved over time. User-driven feedback database 470 receives and stores user feedback provided for previous vehicles to improve future use.

For example, a user may provide feedback about a classified defect severity 472, for example indicating that the severity was incorrect. Additionally, feedback may be provided on a type of defect 474 assigned. Vehicle details 476 may also be corrected using a user feedback interface. Defect location 478, as well as a potential area affected by a given defect, may also be corrected. Generally, defect details are identified based on images of the vehicle captured by defect detection system 410. User feedback helps to ensure that defect identification, classification, and location information gets more accurate over time.

An adjusted list of defects 480 is provided. The adjusted list of defects 480 may be presented on a user interface such that an operator can review and provide feedback 482, which can be incorporated into user-driven feedback database 470 for future use.

Once defects are known for a vehicle, a repair decision 490 needs to be made. If the defects are few and/or easily repaired, the vehicle may go through an on-site repair process 494. However, if there are too many defects, or the defects are not easily repaired on the assembly line, the vehicle may be diverted for a more intensive repair.

The adjusted list of defects 480, in one embodiment, is provided along with a repair recommendation. The recommendation may be presented at repair decision point 490, to a user for example. The user may confirm the repair recommendation, e.g. to either repair the vehicle on-site or divert as recommended, or the user may disagree and override the recommendation.

The adjusted listing of defects 480 may be provided as a prioritized list of defects and defect locations. The prioritization may include a recommended order of repair of defects needing repair. The prioritization may also include one or more defects that do not need to be repaired. For defects that are recommended for repair, the recommendation may also include product recommendations 496 for the repair process.

Figure 5:
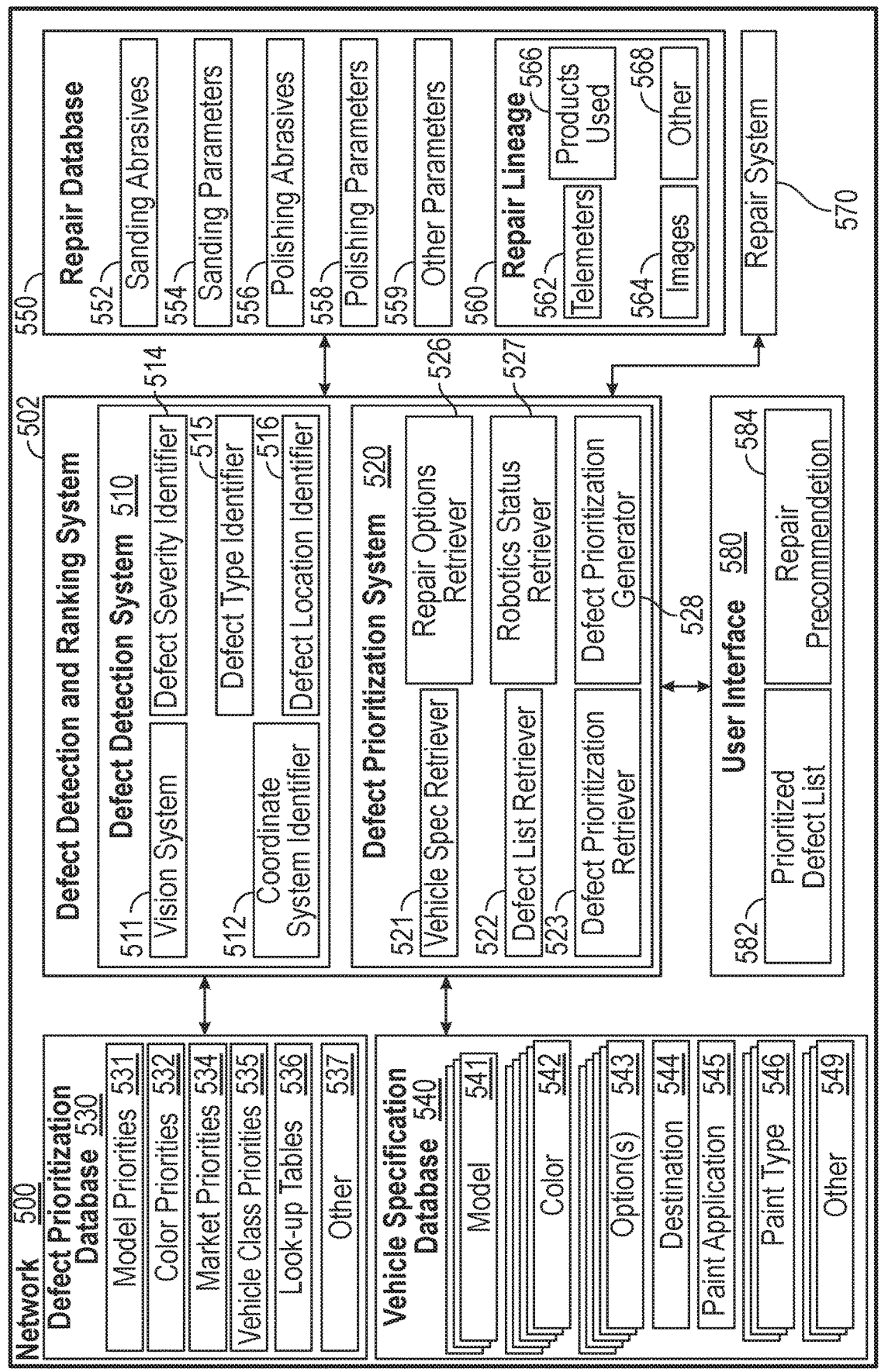
FIG. 5 is a block diagram of a networked vehicle repair system.

FIG. 5 is a block diagram of a networked vehicle repair system. A defect detection and ranking system 500 is accessible, in one embodiment, on a network 500. As used herein, the term network 500 includes a wired network, a wireless network, or a cloud-based network.

A defect detection system 510 inspects a vehicle using a vision system 511. Vision system 511 includes one or more light sources to illuminate vehicle, and one or more image capture systems such as cameras or video cameras. Defects are identified based on the captured images.

For each defect, a defect type is identified using defect type identifier 515. Defect type identifier 515, based on captured images of a defect by vision system 511, identifies each defect. For example, defect type identifier 516 may detect a discontinuity in the surface that corresponds to a scratch. A dent or excess paint may be detected by shadows that would not be present on a surface. For each detected defect, defect severity identifier 514 assigns a severity. For example, a deep scratch is more severe than a shallow scratch. A long scratch is more severe than a short scratch.

A coordinate system identifier 512 identifies a coordinate system for the vehicle. Defect location identifier 516 may, using the coordinate system for the vehicle, for at least some defects, identify a defect center and a defect area. For example, for a piece of debris trapped during the painting process, a center of the defect can be identified, as well as a total area that will need to be sanded during repair. For a scratch, a center of the defect may be identified, as well as a length and direction.

Defect prioritization system 520 retrieves identified defects from defect detection system 510 using defect list retriever 522. The identified defects may be provided along with a location, type and severity. Defect prioritization system also retrieves vehicle specifications from a vehicle specification database 540 using vehicle specification retriever 521.

Vehicle specification database 540 stores information on vehicles in a manufacturing assembly process. A vehicle specification includes a three-dimensional map of the surfaces of the vehicle, to which the defect coordinate system may be matched. A vehicle currently being evaluated for a repair decision may have a model 541, one or more colors 542, one or more options 543 (e.g. for automobiles 2 or 4 doors, spoilers, door trim, hood ornaments, etc.). The vehicle may also have a destination 544, which may be an intended market or even a dealership. Additionally, each vehicle may have a paint type 546 and a paint application process 545. For example, most vehicles have several layers of paint applied as well as several layers of clear coat. One or more primer layers may also be applied. Each layer has an associated thickness and curing regimen. Curing may include the vehicle air-drying or being subjected to heat or another curing process in order to ensure that layers fully dry between applications.

Vehicle specification retriever 521 retrieves information from vehicle specification database 540, including the surface map of the vehicle. Different specifications retrieved may cause defect prioritization system 520 to rank retrieved defects differently. For example, scratches are much easier for customers to see against a black vehicle than against a lighter color. Excess paint is not as visible on a silver, or other metallic color, etc.

Defect prioritization retriever 523 retrieves prioritization information from defect prioritization database 530. The retrieved priorities may also be based on vehicle specification information retrieved by vehicle specification retriever 521. Different vehicle models have different model priorities 531. For example, trucks have different priorities with regard to what defects must be repaired than sedans, etc. Vehicles with different color schemes also have different color priorities 532. Different destination markets may also have different market priorities 534. Different classes of vehicles also have different vehicle class priorities 535. For example, a yacht has different defect priorities and standards than a lower-end motorboat.

Data in defect prioritization database 530 may be stored as a look-up table 536, in one embodiment. However other storage formats 537 are also envisioned.

Repair options retriever 526 retrieves information from a repair database 550. For example, current information about a repair lineage 560 for the identified defects may be retrieved. Repair lineage 560 includes telemetry 562 associated with the defect, including a location of the defect and, after a robotic repair attempt has been made, telemetry regarding the movement of the repair robotics. Repair lineage 560 also includes images 564 associated with the repair including pre-repair images and post-repair images taken during validation of repair. Other information 568 can also be retrieved. Repair lineage 560 may also be retrieved for previous defect repairs that may be relevant to a current repair. For example, telemetry 562 for a previously repaired scratch on a hood may be referenced by defect prioritization generator 528 in determining a repair strategy and an estimated repair time. Repair lineage 560 for a given defect may also include products used 566 for the repair. For example, abrasive grit, type and amounts of polish, amount of water or other fluid dispensed, or other product parameters may be stored as products 566 associated with a defect repair.

Repair options retriever 526 may also retrieve other information from repair database 550. For example, sanding abrasives available 552 and parameters for a sanding robot 554. For example, different abrasive grits may be available and/or different fluids to support sanding may be available. Additionally, different polishing abrasives 556 may be available along with parameters 558 for a polishing robot.

Robotics status retriever 527 communicates with repair system 570 to determine a status of repair robotics. For example, if additional sanding or polishing materials are needed, or if there is an error being reported, robotics status retriever 527 may retrieve such information and present it to user interface 480.

Defect prioritization generator 528, using specifications retrieved by vehicle specification retriever 521, and defect prioritization information retrieved by defect prioritization retriever 523 and the list of defects retrieved by defect list retriever 522, automatically generates a prioritized defect list. For example, defect prioritization generator 528 may select defects in high priority areas as defects that must be repaired and may order those defects in a repair strategy based on information retrieved from repair options retriever 526 and robotics status retriever 527. For example, using known telemetry information 562 from previous repairs, defect prioritization generator can optimize a robot movement path to address the highest priority defects in the shortest time.

Networked repair system 500 may include a user interface 580. User interface 580 may allow an operator of a repair portion of an assembly line to interact with defect prioritization system 520. Among other things, user interface 580 may present a prioritized defect list 582 and a repair recommendation 584. Repair recommendation 584 may include an order of defects to repair and/or recommended products and repair strategy; including telemetry, product amounts to dispense, dwell time, and other parameters for each defect. The prioritization of the repair may also be determined by availability of repair cycles available on the assembly line vs. stop station vs. offline repair station. If there are a number of noncritical defects being identified, but high demand for vehicle production during that production period, defect repair might be deprioritized. Or, if stop stations and offline repair stations are not available or full then defect repair might also be reprioritized.

User interface 580 may also allow an operator to interact with repair lineage 560, for example viewing defect images 564, product usage 566 during a repair, or other information 568 related to a repair. Additionally, using user interface 580, an operator may be able to provide feedback on prioritized defect list 582 and repair recommendation 584. For example, an operator may change a priority of a defect on the prioritized defect list 582 or may input a different repair strategy 584 for a given defect.

Figure 6:
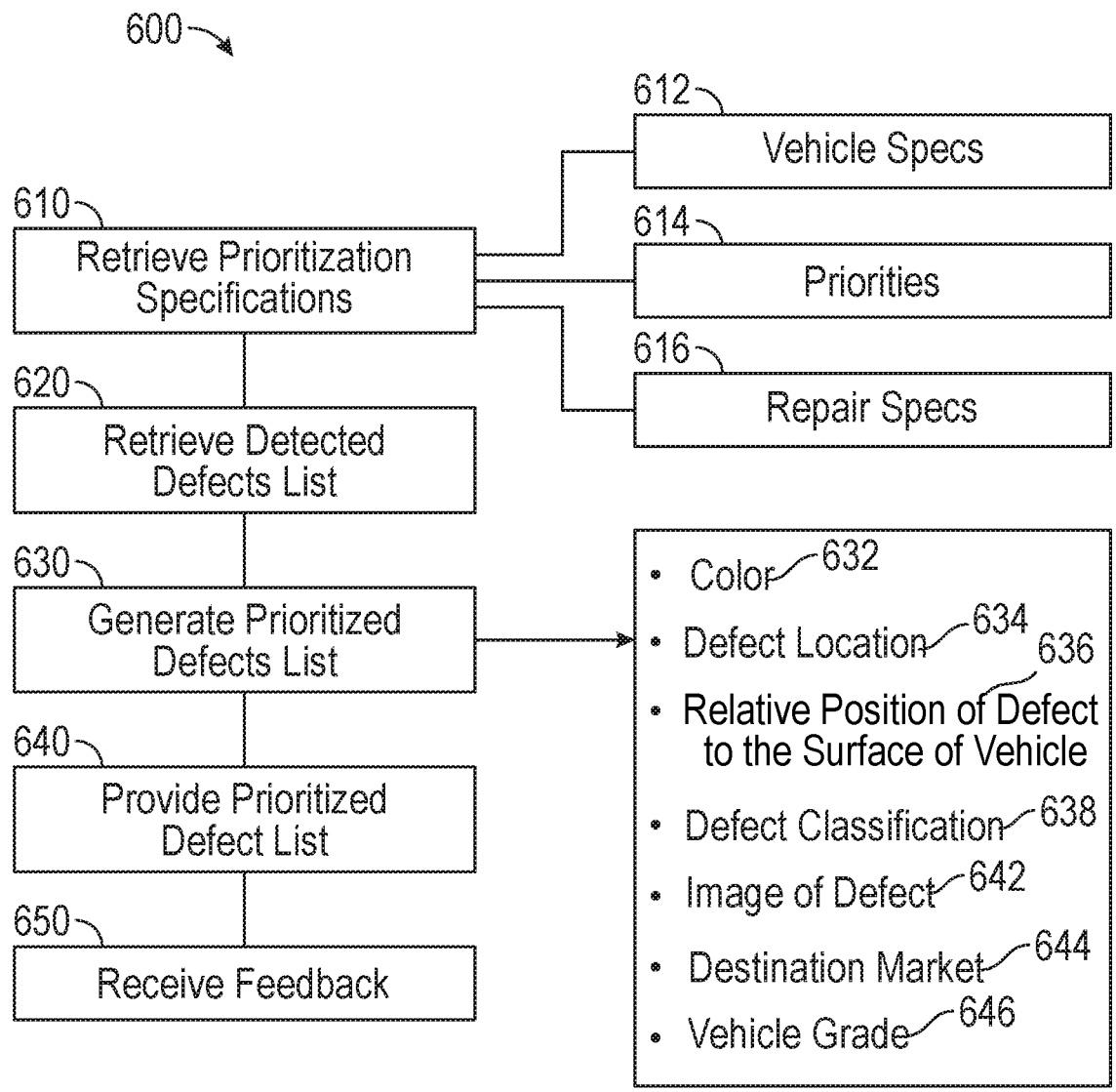
FIG. 6 is a block diagram of a method of prioritizing defects for repair.

FIG. 6 is a block diagram of a method of prioritizing defects for repair. Method 600 is, in one embodiment, carried out automatically by a processor in a repair prioritization system.

In block 610, prioritization specifications are retrieved. For example, prioritization specifications include information about a vehicle 612 being evaluated. For example, a vehicle's make, model, color, detailing options, etc. can be retrieved. Prioritization specifications 614 are also retrieved, including vehicle grade priorities, destination priorities, and other relevant priorities for a given vehicle. Repair specifications 616 are also retrieved, including information about previous repairs of similar vehicles. Additionally, previous user feedback may also be retrieved.

In block 620 a list of detected defects is received. Defects are detected on a vehicle using a vision system that often includes one or more light sources and one or more cameras that capture images of a vehicle. The vision system also includes a processor that detects defects based on the captured images of the vehicle. The list of defects is often provided as a series of coordinates associated with each defect. Each defect may also include a defect type and/or severity ranking.

In block 630, a prioritized list of defects is generated. The prioritized list of defects is generated automatically by applying the retrieved prioritization specifications to the retrieved list of defects. For example, depending on the vehicle, different features may result in different defects being prioritized higher. Prioritization of defects will consider color 632, defect location 634, relative position of a defect to the surface of the vehicle 636, defect type 638, defect image captured 642, destination market 644 and/or vehicle grade 646. Prioritization may include ordering the defects in a repair order. Prioritization may also include grouping defects in groups such as 'repair' or 'not repair' depending on the prioritization specifications retrieved.

The generated prioritized defect list is provided in block 640. The prioritized defect list may be provided for review to an operator of an assembly line, for example, on a user interface. Providing the prioritized defect list may also include providing instructions for repairing at least some defects on the prioritized defect list to repair robotics.

In block 650, feedback is received. In one embodiment, feedback is received from an operator through a user interface based on the prioritized defect list. However, in some embodiments, feedback is only provided after a repair is completed.

Benefits of using systems and methods described herein include increased efficiency of defect repair. Human-based repair strategy often includes biases such as limiting required movement of a human back and forth and around a vehicle and ensuring that defects are not overlooked. For this reason, humans often repair defects on a vehicle in a systematic way—top-to-bottom, front-to-back. Using robotics to repair defects, and having an automated system for prioritizing defects for repair removes the biases of human repair technicians without overlooking defects that need to be repaired. Defects are also objectively considered and ranked by measurable criteria, which removes subjectivity of human repair technicians. Additionally, the time required to repair defects is reduced. Blocks 610-640 of method 600 may be accomplished, in some embodiments, in under about 5 minutes. In some embodiments, blocks 610-640 can be accomplished in under about 1 minute. This results in a more objective repair strategy, based customizable criteria, delivered faster than could be done by human review.

Figure 7:
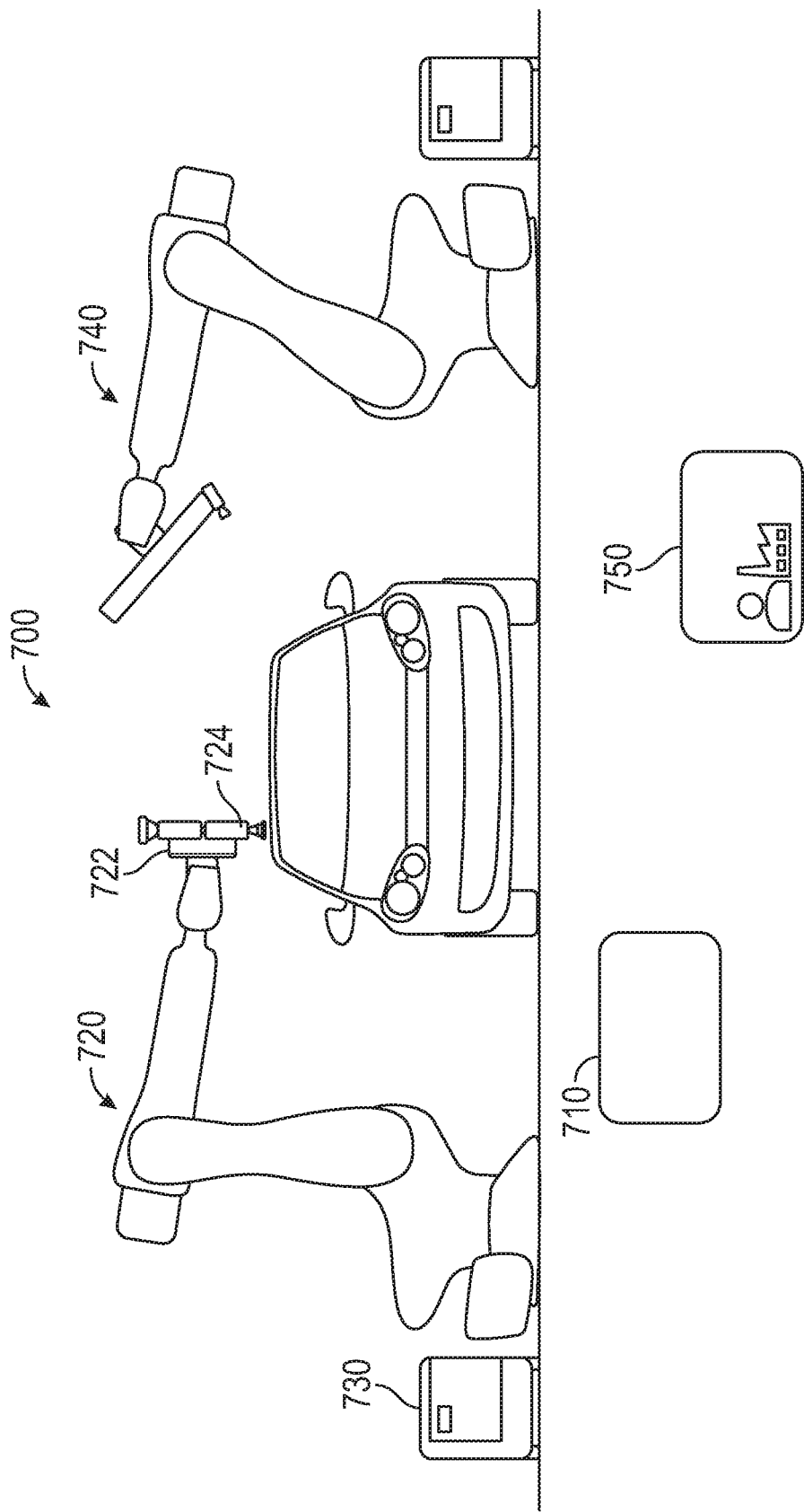
FIG. 7 illustrates a vehicle repair system.

FIG. 7 illustrates a vehicle repair system. System 700 illustrates one example system that could use systems and methods described herein. However, systems and methods described herein are not limited to the system illustrated in FIG. 7.

A controller 710 provides instructions to robotic motion controller 730, which causes robot 720 to move. Movement of robot 720 allows for an abrasive tool 724 to contact a surface of a vehicle. Abrasive tool 724 may include sanding or polishing tooling. Abrasive tool 724 may also include a fluid dispenser, which may dispense water, polish or other fluid. A force compliance mechanism 722 may regulate an amount of force applied by abrasive tool 724 to a surface. Different amounts of force, over different dwell times, will cause different amounts of paint to be removed from the vehicle surface. While FIG. 7 illustrates only one robot 720 for simplicity, more robots, or additional abrasive tooling 724, may be present in other embodiments.

In some embodiments, a validation robot 740 is also present in system 700. However, while validation robot 740 is illustrated as a separate system that receives control signals from controller 710, it is also understood that, in some embodiments, a validation system may be included as part of a repair robot 720.

Controller 710, in one embodiment, generates a repair strategy for repair robot 720. The repair strategy includes an order of defects to be repaired, based on a prioritized list of defects to be repaired. Controller 710 may also generate the prioritized list of defects, in one embodiment, based on information received about a vehicle. Information about a vehicle and about repair priorities for the vehicle may come from system 750. System 750 may also include a user interface such that an operator can review the prioritized list of defects and/or the repair strategy and provide feedback to improve prioritization for future repairs.

Figure 8:
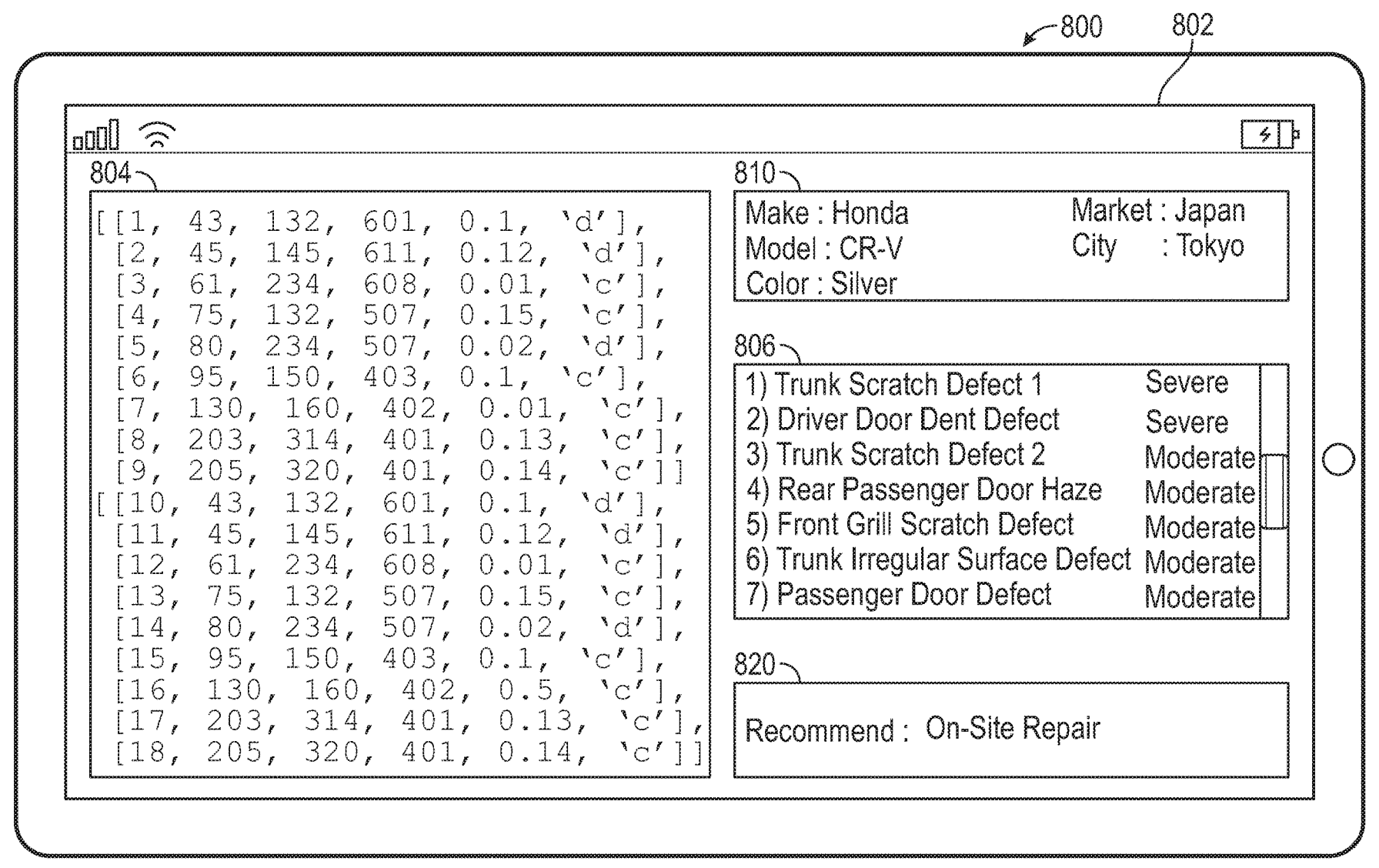

FIG. 8 is an example user interface for a vehicle repair system. FIG. 8 shows a computer 800 is shown with user interface display screen 802. Screen 802 can be a touch screen or a pen-enabled interface that receives inputs from a pen or stylus. It can also use an on-screen virtual keyboard. Of course, it might also be attached to a keyboard or other user input device through a suitable attachment mechanism, such as a wireless link or USB port, for instance. Computer 800 can also illustratively receive voice inputs as well. While computer 800 is illustrated as a tablet, it could also be a desktop or laptop computer, in other embodiments.

On screen 802, in one embodiment, is a preliminary list of coordinates 804. These coordinates may be the coordinates output from a defect detection system, prior to prioritization. In a traditional repair system, these coordinates would serve as the basis for human repair technicians to repair a vehicle.

Also present, in one embodiment, is a prioritized listing of defects 806 including a location, a type of defect and a severity for each defect. In some embodiments, each defect in listing 806 may be selectable, such that an operator can see which priorities contributed to a ranking. Each defect in listing 806 may also be arrangeable, in one embodiment, as a form of user feedback.

Information about a vehicle being evaluated may also be presented in information box 810. For example, a silver Honda™ CR-V is presented that is intended for a dealership in Tokyo, Japan.

A repair recommendation may also be provided, as indicated in block 820. For example, based on the defects detected, the noted vehicle can be repaired on-site. Repair recommendation 820 may be selectable, in some embodiments, such that an operator can review repair instructions to be sent to a repair robot including telemetry and abrasive products to be used.

Figure 9:
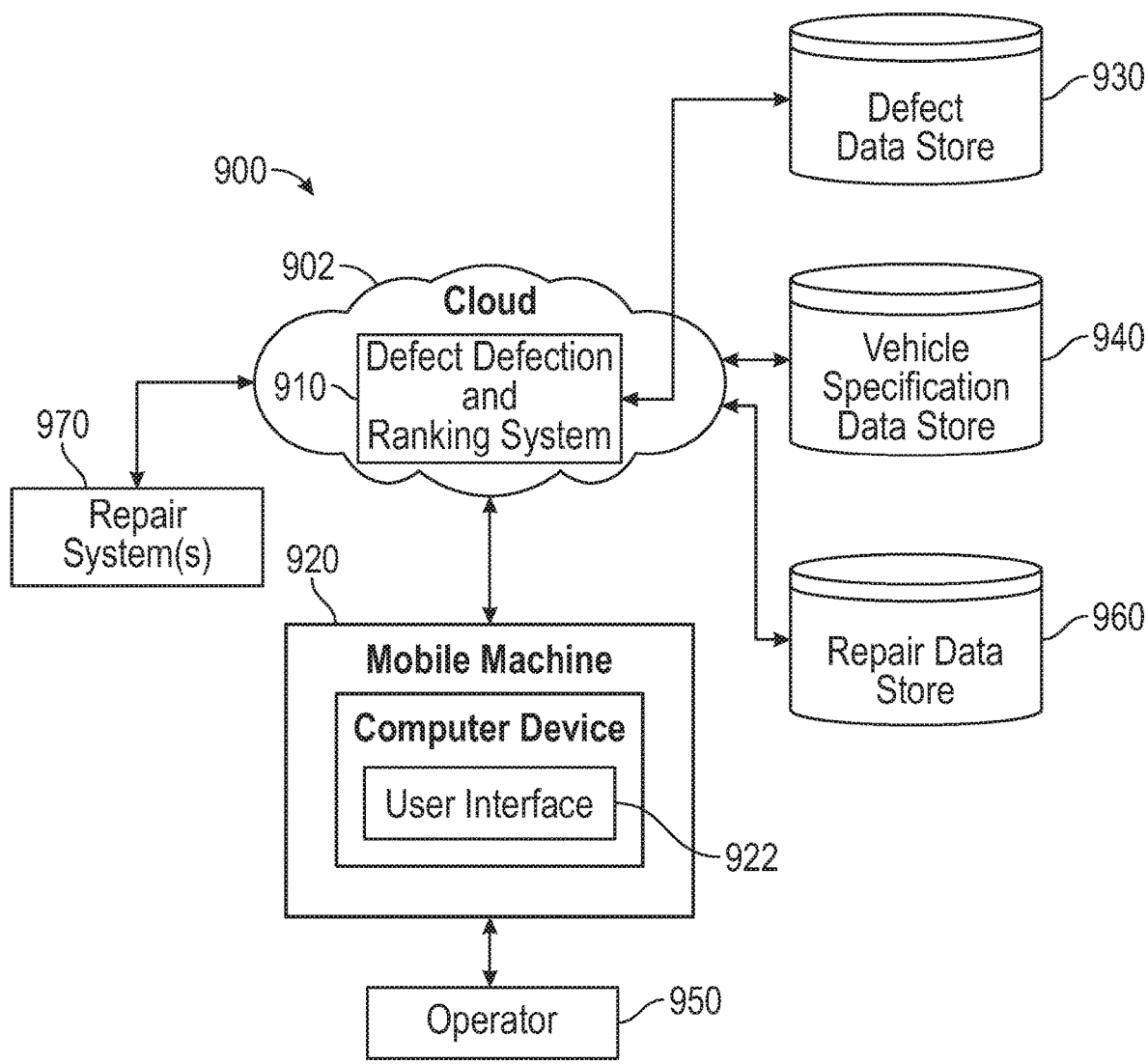
FIG. 9 is a block diagram of a defect detection and ranking system architecture.

FIG. 9 is a block diagram of a defect detection and ranking system architecture. The remote server architecture 900 illustrates one embodiment of an implementation of a defect detection and ranking system 910. As an example, remote server architecture 900 can provide computation, software, data access, and storage services that do not require end-user knowledge of the physical location or configuration of the system that delivers the services. In various embodiments, remote servers can deliver the services over a wide area network, such as the internet, using appropriate protocols. For instance, remote servers can deliver applications over a wide area network and they can be accessed through a web browser or any other computing component. Software or components shown or described in FIGS. 1-8 as well as the corresponding data, can be stored on servers at a remote location. The computing resources in a remote server environment can be consolidated at a remote data center location or they can be dispersed. Remote server infrastructures can deliver services through shared data centers, even though they appear as a single point of access for the user. Thus, the components and functions described herein can be provided from a remote server at a remote location using a remote server architecture. Alternatively, they can be provided by a conventional server, installed on client devices directly, or in other ways.

In the example shown in FIG. 9, some items are similar to those shown in earlier figures. FIG. 9 specifically shows that defect detection and ranking system can be located at a remote server location 902. Therefore, computing device 920 accesses those systems through remote server location 902. Operator 950 can use computing device 920 to access user interfaces 922 as well.

FIG. 9 also depicts another example of a remote server architecture. FIG. 9 shows that it is also contemplated that some elements of systems described herein are disposed at remote server location 902 while others are not. By way of example, storage 930, 940 or 960 or repair systems 970 can be disposed at a location separate from location 902 and accessed through the remote server at location 902. Regardless of where they are located, they can be accessed directly by computing device 720, through a network (either a wide area network or a local area network), hosted at a remote site by a service, provided as a service, or accessed by a connection service that resides in a remote location. Also, the data can be stored in substantially any location and intermittently accessed by, or forwarded to, interested parties. For instance, physical carriers can be used instead of, or in addition to, electromagnetic wave carriers.

It will also be noted that the elements of FIGS. 1-5 or portions of them, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 10:
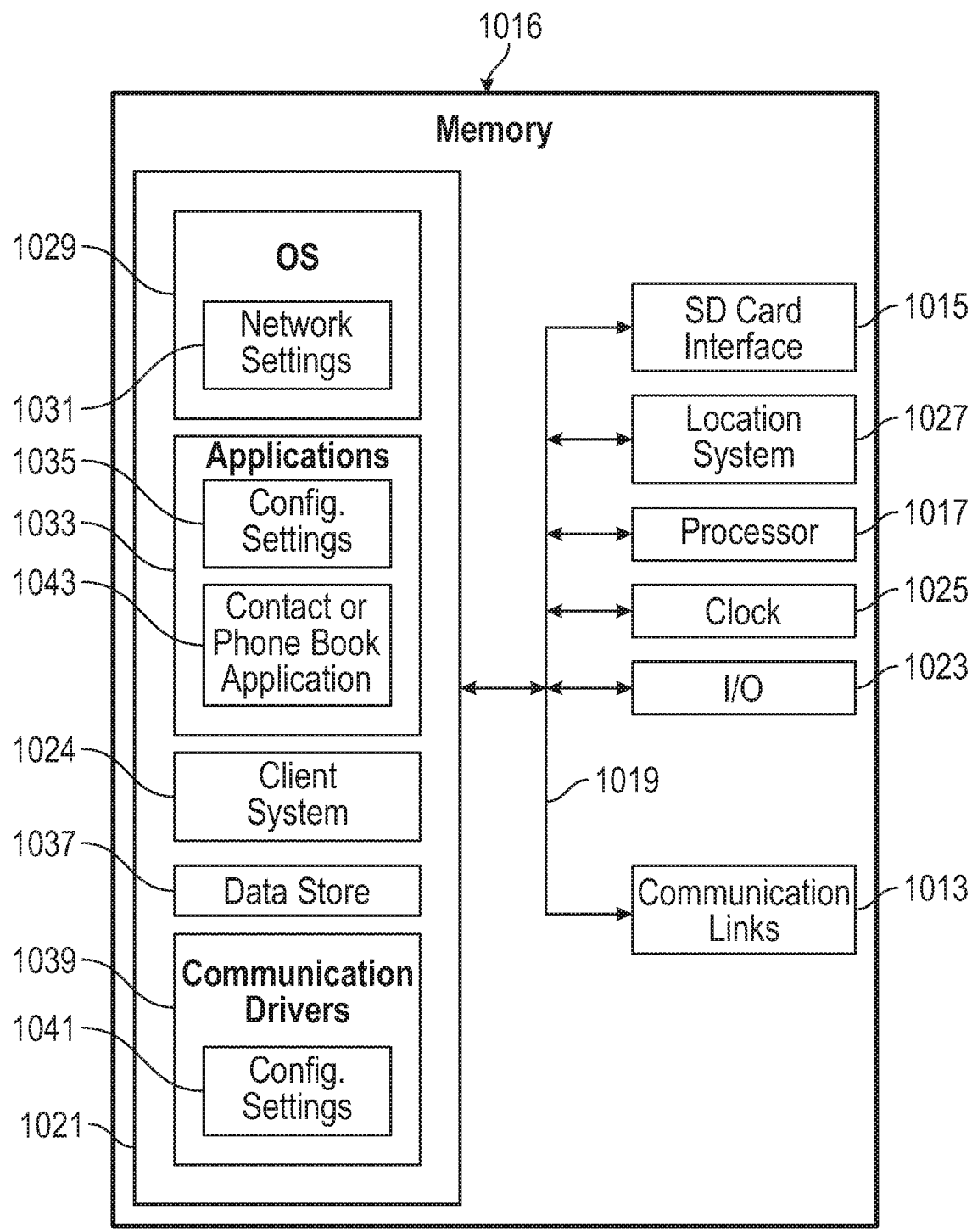
FIGS. 10-11 show examples of mobile devices that can be used in the embodiments shown in previous Figures.
Figure 11:
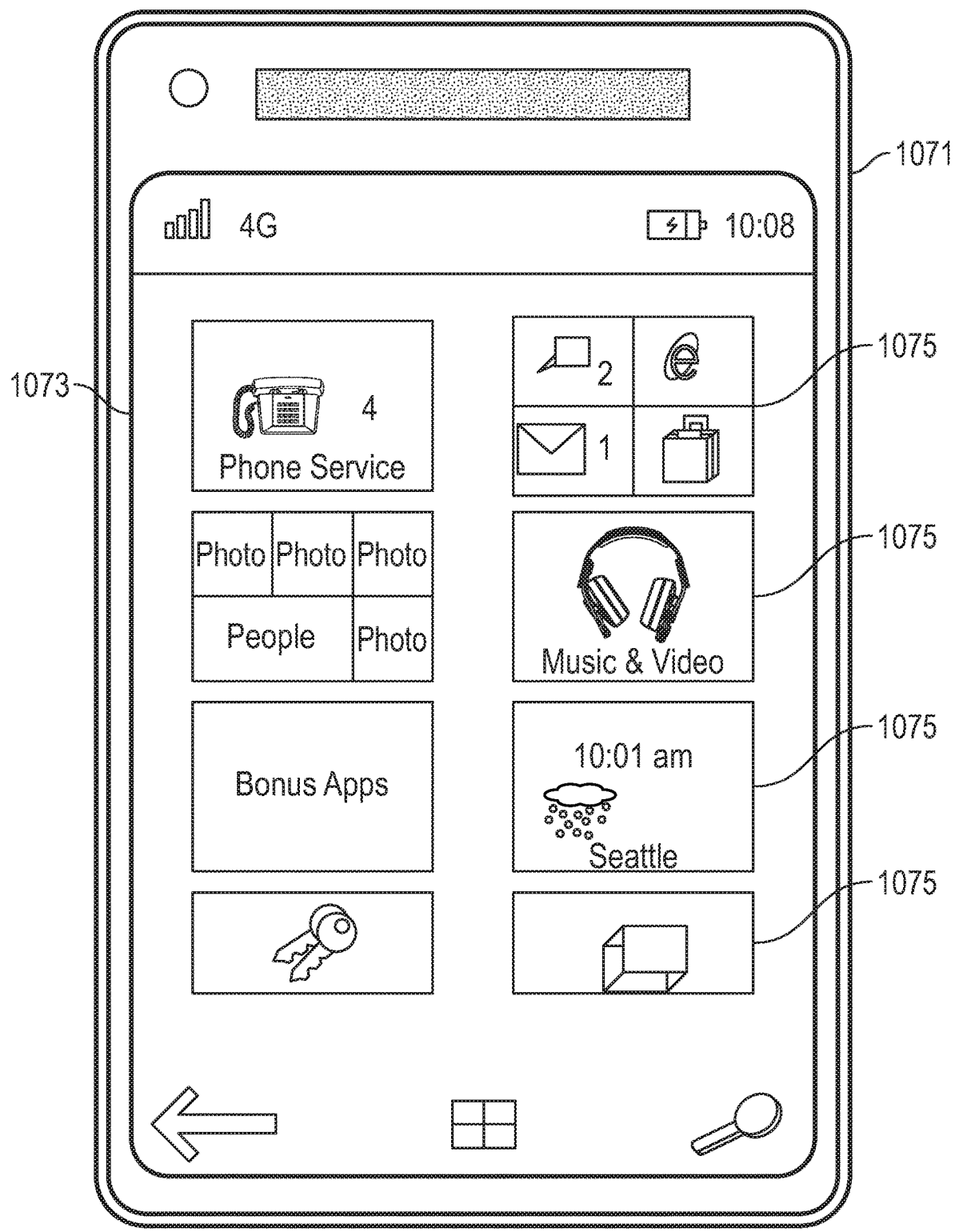

FIGS. 10-11 show examples of mobile devices that can be used in the embodiments shown in previous Figures.

FIG. 10 is a simplified block diagram of one illustrative example of a handheld or mobile computing device that can be used as a user's or client's handheld device 16 (e.g., as computing device 920 in FIG. 9), in which the present system (or parts of it) can be deployed. For instance, a mobile device can be deployed in the operator compartment of computing device 920 for use in generating, processing, or displaying the data. FIG. 11 is another example of a handheld or mobile device.

FIG. 10 provides a general block diagram of the components of a client device 1016 that can run some components shown in FIGS. 1-5 that interacts with them, or runs some and interacts with some. In the device 1016, a communications link 1013 is provided that allows the handheld device to communicate with other computing devices and under some embodiments provides a channel for receiving information automatically, such as by scanning. Examples of communications link 1013 include allowing communication though one or more communication protocols, such as wireless services used to provide cellular access to a network, as well as protocols that provide local wireless connections to networks.

In other examples, applications can be received on a removable Secure Digital (SD) card that is connected to an interface 1015. Interface 1015 and communication links 1013 communicate with a processor 1017 (which can also embody a processor) along a bus 1019 that is also connected to memory 1021 and input/output (I/O) components 1023, as well as clock 1025 and location system 1027.

I/O components 1023, in one embodiment, are provided to facilitate input and output operations and the device 1016 can include input components such as buttons, touch sensors, optical sensors, microphones, touch screens, proximity sensors, accelerometers, orientation sensors and output components such as a display device, a speaker, and or a printer port. Other I/O components 1023 can be used as well.

Clock 1025 illustratively comprises a real time clock component that outputs a time and date. It can also provide timing functions for processor 1017.

Illustratively, location system 1027 includes a component that outputs a current geographical location of device 1016. This can include, for instance, a global positioning system (GPS) receiver, a LORAN system, a dead reckoning system, a cellular triangulation system, or other positioning system. It can also include, for example, mapping software or navigation software that generates desired maps, navigation routes and other geographic functions.

Memory 1021 stores operating system 1029, network settings 1031, applications 1033, application configuration settings 1035, data store 1037, communication drivers 1039, and communication configuration settings 1041. Memory 1021 can include all types of tangible volatile and non-volatile computer-readable memory devices. It can also include computer storage media (described below). Memory 1021 stores computer readable instructions that, when executed by processor 1017, cause the processor to perform computer-implemented steps or functions according to the instructions. Processor 1017 can be activated by other components to facilitate their functionality as well.

FIG. 11 shows that the device can be a smart phone 1071. Smart phone 1071 has a touch sensitive display 1073 that displays icons or tiles or other user input mechanisms 1075. Mechanisms 1075 can be used by a user to run applications, make calls, perform data transfer operations, etc. In general, smart phone 1071 is built on a mobile operating system and offers more advanced computing capability and connectivity than a feature phone.

Note that other forms of the devices 1016 are possible.

Figure 12:
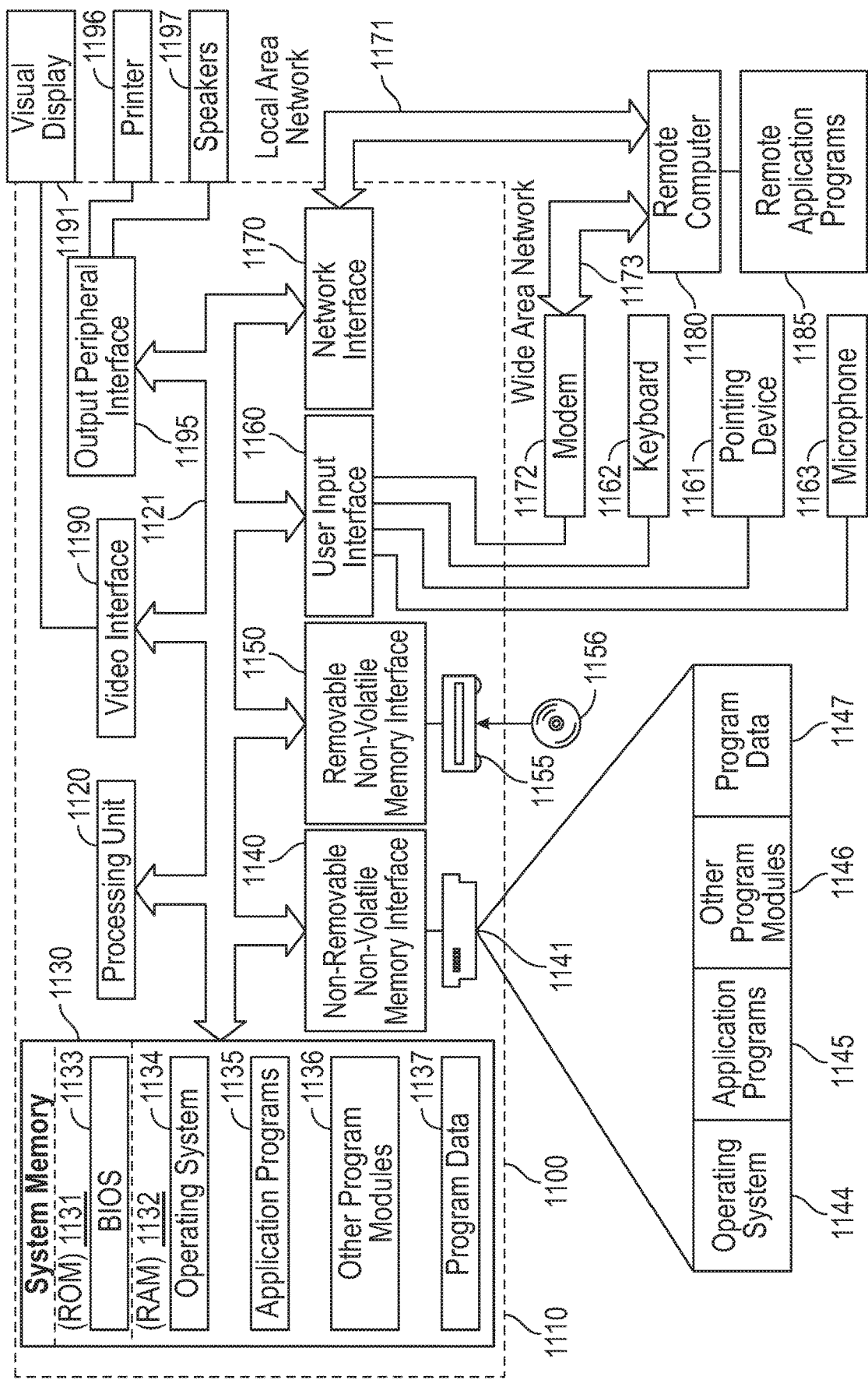
FIG. 12 is a block diagram of a computing environment that can be used in embodiments shown in previous Figures.

FIG. 12 is a block diagram of a computing environment that can be used in embodiments shown in previous Figures.

FIG. 12 is one example of a computing environment in which elements of FIGS. 1-5, or parts of them (for example), can be deployed. With reference to FIG. 12, an example system for implementing some embodiments includes a general-purpose computing device in the form of a computer 1110. Components of computer 1110 may include, but are not limited to, a processing unit 1120 (which can comprise a processor), a system memory 1130, and a system bus 1121 that couples various system components including the system memory to the processing unit 1120. The system bus 1121 may be any of several types of bus structures including a memory bus or memory controller, a peripheral bus, and a local bus using any of a variety of bus architectures. Memory and programs described with respect to FIGS. 1-5 can be deployed in corresponding portions of FIG. 12.

Computer 1110 typically includes a variety of computer readable media. Computer readable media can be any available media that can be accessed by computer 1110 and includes both volatile/nonvolatile media and removable/non-removable media. By way of example, and not limitation, computer readable media may comprise computer storage media and communication media. Computer storage media is different from, and does not include, a modulated data signal or carrier wave. It includes hardware storage media including both volatile/nonvolatile and removable/non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 1110. Communication media may embody computer readable instructions, data structures, program modules or other data in a transport mechanism and includes any information delivery media. The term "modulated data signal" means a signal that has one or more of its characteristics set or changed in such a manner as to encode information in the signal.

The system memory 1130 includes computer storage media in the form of volatile and/or nonvolatile memory such as read only memory (ROM) 1131 and random access memory (RAM) 1132. A basic input/output system 1133 (BIOS) containing the basic routines that help to transfer information between elements within computer 1110, such as during start-up, is typically stored in ROM 1131. RAM 1132 typically contains data and/or program modules that are immediately accessible to and/or presently being operated on by processing unit 1120. By way of example, and not limitation, FIG. 12 illustrates operating system 1134, application programs 1135, other program modules 1136, and program data 1137.

The computer 1110 may also include other removable/non-removable and volatile/nonvolatile computer storage media. By way of example only, FIG. 12 illustrates a hard disk drive 1141 that reads from or writes to non-removable, nonvolatile magnetic media, nonvolatile magnetic disk 1152, an optical disk drive 1155, and nonvolatile optical disk 1156. The hard disk drive 1141 is typically connected to the system bus 1121 through a non-removable memory interface such as interface 1140, and optical disk drive 1155 are typically connected to the system bus 1121 by a removable memory interface, such as interface 1150.

Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (e.g., ASICs), Application-specific Standard Products (e.g., ASSPs), System-on-a-chip systems (SOCs), Complex Programmable Logic Devices (CPLDs), etc.

The drives and their associated computer storage media discussed above and illustrated in FIG. 12, provide storage of computer readable instructions, data structures, program modules and other data for the computer 1110. In FIG. 12, for example, hard disk drive 1141 is illustrated as storing operating system 1144, application programs 1145, other program modules 1146, and program data 1147. Note that these components can either be the same as or different from operating system 1134, application programs 1135, other program modules 1136, and program data 1137.

A user may enter commands and information into the computer 1110 through input devices such as a keyboard 1162, a microphone 1163, and a pointing device 1161, such as a mouse, trackball or touch pad. Other input devices (not shown) may include a joystick, game pad, satellite receiver, scanner, or the like. These and other input devices are often connected to the processing unit 1120 through a user input interface 1160 that is coupled to the system bus, but may be connected by other interface and bus structures. A visual display 1191 or other type of display device is also connected to the system bus 1121 via an interface, such as a video interface 1190. In addition to the monitor, computers may also include other peripheral output devices such as speakers 1197 and printer 1196, which may be connected through an output peripheral interface 1195.

The computer 1110 is operated in a networked environment using logical connections, such as a Local Area Network (LAN) or Wide Area Network (WAN) to one or more remote computers, such as a remote computer 1180.

When used in a LAN networking environment, the computer 1110 is connected to the LAN 1171 through a network interface or adapter 1170. When used in a WAN networking environment, the computer 1110 typically includes a modem 1172 or other means for establishing communications over the WAN 1173, such as the Internet. In a networked environment, program modules may be stored in a remote memory storage device. FIG. 12 illustrates, for example, that remote application programs 1185 can reside on remote computer 1180.

It should also be noted that the different embodiments described herein can be combined in different ways. That is, parts of one or more embodiments can be combined with parts of one or more other embodiments. All of this is contemplated herein.

Embodiments

Embodiment 1 is a defect detection and ranking system for a vehicle assembly line. The system includes an image capture device that captures a plurality of images of a vehicle on the vehicle assembly line. The system also includes a datastore containing a vehicle specification, for the vehicle on the vehicle assembly line, and a defect priority based on the vehicle specification/The system also includes a defect detector that analyzes the plurality of captured images and, based on the analysis, detects a plurality of defects on the surface of the vehicle. Each the detect detector associates, for each of the plurality of defects, an x-y-z coordinate location, a defect type, and a defect severity. The system also includes a defect prioritization generator configured to: receive the plurality of defects from the defect detector, retrieve the vehicle specification and the defect priority, apply the defect priority to the plurality of defects, and generate a prioritized list of defects. The defect prioritization generator outputs the prioritized list of defects to an output device associated with the vehicle assembly line.

Embodiment 2 includes the features of embodiment 1, however the defect type is one of a scratch, a dent or an excess paint.

Embodiment 3 includes the features of any of embodiments 1-2, however the plurality of defects includes a first defect with a first defect location, and a second defect with a second defect location. The defect priority is a location of a defect. The first defect is prioritized higher than the second defect.

Embodiment 4 includes the features of embodiment 3, however the vehicle is a car, the first defect is located on a driver door of the car and the second defect is located on a roof of the car.

Embodiment 5 includes the features of any of embodiments 1-4, however the vehicle specification is a first vehicle color. A defect type of one of the plurality of defects is a scratch. The defect priority for the scratch is higher for the first vehicle color than for a second vehicle color.

Embodiment 6 includes the features of embodiment 5, however the first color is black and the second color is silver.

Embodiment 7 includes the features of embodiments 1-6, however it also includes a sensor configured to identify the vehicle. The defect prioritization generator automatically retrieves the vehicle specification and the defect priority based on the identified vehicle.

Embodiment 8 includes the features of embodiment 7, however the defect prioritization generator automatically applies the vehicle specification and defect priority when the plurality of defects is received.

Embodiment 9 includes the features of any of embodiments 1-8, however the defect prioritization generator also provides a repair recommendation with the prioritized list of defects. The repair recommendation is either to repair the vehicle on-site or to divert the vehicle for repair.

Embodiment 10 includes the features of embodiment 9, however the repair recommendation also includes an instruction to not repair a subset of the plurality of defects.

Embodiment 11 includes the features of embodiment 10, however the repair recommendation also includes instructions for a repair robot to repair at least one defect. The instructions include a telemetry for the repair robot.

Embodiment 12 includes the features of embodiment 11, however the instructions also include an abrasive product, a force to apply, trajectory and a dwell time for the at least one defect.

Embodiment 13 includes the features of any of embodiments 1-12, however defect priority is selected from a model priority, a color priority, a defect location priority, a destination priority, a vehicle grade priority, a vehicle paint priority, a paint application priority.

Embodiment 14 includes the features of any of embodiments 1-13, however the captured plurality of images are stored in a repair lineage database. The defect prioritization generator retrieves an image of a defect from the repair lineage database. The defect prioritization generator prioritizes the defect based at least in part on the retrieved image.

Embodiment 15 includes the features of any of embodiments 1-14, however the output device includes an input device configured to receive an indication of user feedback. The indication of user feedback alters a position of a defect in the prioritized list of defects.

Embodiment 16 includes the features of embodiment 15, however the indication of user feedback is stored in the datastore.

Embodiment 17 includes the features of any of embodiments 1-16, however the vehicle specification includes a three-dimensional map of a surface of the vehicle.

Embodiment 18 is a computer-implemented method for ranking detected surface defects on a vehicle on an assembly line. The method includes receiving an identification of the vehicle. The method also includes receiving, using a defect list retriever to access a defect database stored in a defect memory, a plurality of detected surface defects on the vehicle. Each of the plurality of detected surface defects has a defect location, a defect type, and a defect severity. The method also includes automatically retrieving, based on the identification of the vehicle, using a specification retriever to access a specification database stored in a specification memory, a first vehicle specification and a second vehicle specification using a vehicle specification retriever. The method also includes automatically retrieving, using a defect priority retriever to access a defect priority database stored in a priority memory, a first defect priority based on the first vehicle specification and a second defect priority based on the second vehicle specification. The method also includes generating a defect priority list, using a defect prioritization generator, by applying the first defect priority and the second defect priority to the plurality of defects. The defect priority list includes a ranking of the plurality of detected surface such that a first of the plurality of defects is ranked higher than a second of the plurality of defects based on applying the first and second defect priorities to the defect location, defect type and defect severity. The method also includes providing the defect priority list as an output to an output device associated with the assembly line. The steps of receiving an identification, receiving a plurality of detected surface defects, retrieving vehicle specifications, generating a defect priority list and providing a defect priority list are performed by a non-transitory computer-readable storage medium including instructions that, when executed by at least one processor of a computing device, cause the at least one processor to perform the steps of the defect list retriever, the vehicle specification retriever, the defect priority list, and providing the defect priority list.

Embodiment 19 includes the features of embodiment 18, however the first and second vehicle specifications are selected from the group consisting of: a vehicle model, a vehicle color, a vehicle option, a vehicle destination, a vehicle paint type, a vehicle paint application.

Embodiment 20 includes the features of any of embodiments 18-19, however the first and second defect priority are selected from the group consisting of: defect location priority, defect classification priority, vehicle color priority, vehicle grade priority, and relative defect position priority.

Embodiment 21 includes the features of any of embodiments 18-20, however it also includes imaging the vehicle. Imaging includes capturing a plurality of images using a camera and stitching the plurality of images together using a processor. The method also includes detecting the plurality of surface defects on the vehicle. Detecting includes the processor analyzing the stitched images for potential defects. The defect detection processor identifies a defect feature. The defect feature includes the defect location and the defect type for each detected surface defect.

Embodiment 22 includes the features of any of embodiments 18-21, however the output device has a screen and the defect priority list is provided on the screen.

Embodiment 23 includes the features of any of embodiments 81-22, however the output device also has an input device configured to receive user feedback for the defect priority list. The user feedback is automatically associated with the first and second vehicle specifications.

Embodiment 24 includes the features of embodiment 23, however the vehicle is a first vehicle. Upon receiving an identification of a second vehicle with the first and second vehicle specifications, the user feedback is retrieved and applied to a second plurality of defects associated with the second vehicle.

Embodiment 25 includes the features of any of embodiments 18-24, however the output device also has an input device configured to receive user feedback for the defect priority list. The user feedback is automatically associated with the first and second defect priorities.

Embodiment 26 includes the features of embodiment 25, however the vehicle is a first vehicle. Upon receiving an identification of a second vehicle with the first and second defect priorities, the user feedback is retrieved and applied to a second plurality of defects associated with the second vehicle.

Embodiment 27 includes the features of any of embodiments 18-26, however the first vehicle specification is a vehicle model. The first defect priority is a defect location. The prioritization for a first detected defect location and vehicle model is higher than for a second detected defect with a second location.

Embodiment 28 includes the features of any of embodiments 18-27, however the first vehicle specification is a first vehicle color. The defect priority is a defect type. The prioritization for a first detected defect with a first defect type is higher than a second detected defect with a second defect type.

Embodiment 29 includes the features of embodiment 28, however for a second vehicle with a second vehicle color different than the first vehicle color, the prioritization for the second detected defect is higher than the first detected defect.

Embodiment 30 is a vehicle repair prioritization system for an assembly line. The system includes a vehicle specification database including specifications for a vehicle on the assembly line, the database including a first specification and a second specification. The first specification is a vehicle color indication for the vehicle. The system also includes a defect database including a list of detected defects for the vehicle. Each detected defect has an associated defect location and defect type. The system also includes a non-transitory computer-readable medium with instructions stored thereon, that when executed by a processor, is configured to: retrieve the first and second specifications, retrieve a first priority, based on the first specification, and a second priority, based on the second specification. The first priority is a color priority. The computer-readable medium is also configured to retrieve the list of detected defects, generate a prioritized list of defects by apply the first and second priority to each defect on the list of defects to determine a priority of defects to be repaired, and output the prioritized list of defects to an output device associated with the assembly line.

Embodiment 31 includes the features of embodiment 30, however the system is a networked system.

Embodiment 32 includes the features of embodiment 31, however the system also includes a repair system in communication with the vehicle repair prioritization system.

Embodiment 33 includes the features of embodiment 32, however the repair system includes a repair lineage database that stores indicia of previously repaired defects. Indicia includes at least one of: pre-repair images, post-repair images, telemetry for robotic repair, and a type and amount of abrasive product applied.

Embodiment 34 includes the features of any of embodiments 30-33, however the processor automatically retrieves the specifications, retrieves the detected defects and generates a prioritized list of defects based on a received indication that the vehicle is ready for repair.

Embodiment 35 includes the features of embodiment 34, however the indication is received from a sensor detecting the vehicle on assembly line.

Embodiment 36 includes the features of any of embodiments 30-35, however the list of detected defects provided from a defect detection system including a camera and a processor configured to analyze images captured by the camera. The processor is configured to, based on the analysis, detect defects on the vehicle and assign the defect a defect location and defect type.

Embodiment 37 includes the features of any of embodiments 30-36, however the second vehicle specifications is selected from the group consisting of: a vehicle model, a vehicle destination, a vehicle paint type, a vehicle paint application parameter, or a vehicle option.

Embodiment 38 includes the features of any of embodiments 30-37, however the prioritized list is an ordered list of defects to be repaired.

Embodiment 39 includes the features of any of embodiments 30-38, however the prioritized list includes a first subset of detected defects designated as to be repaired and a second subset of defects designated as not to be repaired.

Embodiment 40 includes the features of any of embodiments 30-39, however the processor is also configured to output a repair recommendation for the vehicle. The repair recommendation is either to repair the vehicle on the assembly line or divert the vehicle for repair.

Embodiment 41 includes the features of embodiment 40, however the repair recommendation also includes telemetry for a repair robot to repair a plurality of defects on the prioritized list of defects.

Embodiment 42 includes the features of embodiment 41, however the repair recommendation also includes a product recommendation for a defect on the prioritized list of defects.

Embodiment 43 includes the features of embodiment 42, however the product recommendation is based in part on a previous repair history for a previous vehicle with a first and second specification.

Embodiment 44 includes the features of embodiment 42, however the product recommendation is based in part on a previous repair history for a previous vehicle with a defect similar to the defect.

Embodiment 45 includes the features of embodiment 42, however the repair recommendation is communicated to a repair robot.

Embodiment 46 includes the features of any of embodiments 30-45, however the prioritized list of defects is output to a repair robot assigned to repair the vehicle.

Embodiment 47 includes the features of any of embodiments 30-46, however the output device is a robotic repair unit. The robotic repair unit is configured to implement a repair based on the prioritized list of defects.

EXAMPLES

Example 1: Detecting a Defect

The general source of a typical defect includes particles that become trapped into applied paint, clumping of paint components, scratches, indents or excessive paint. FIG. 11A illustrates a defect caused by a particle of highly reflective paint contaminant that is less than a tenth of a millimeter in size. FIG. 11A is zoomed in on a black painted surface with a clear coat, the defect shown under a microscope.

FIG. 11B illustrates a similar defect within the reflection of the top surface. The defect is detectable and appears as a shadow in the image.

For ease of understanding, the following examples concern small sets of defects on a vehicle. However, it is to be understood that, in many assembly sites, a given vehicle can have dozens of surface defects that need to be evaluated for repair, and then prioritized.

Example 2: Prioritizing Defects

Table 1 below illustrates an example defect list output from a defect detection system. Defects are output through a coordinate system along with a defect volume and defect type.

TABLE 1

| x | y | z | volume | Type |
|---|---|---|--------|------|
| 43 | 132 | 601 | 0.1 | D |
| 92 | 207 | 105 | 0.01 | S |
| 218 | 386 | 385 | 0.12 | C |
| ... | ... | ... | ... | ... |

In Table 1, x, y & z provide a location in 3-dimensional space. The volume represents the size of the defect with the center of the defect in space relates to the generalized volume. The type in this case uses d—drip, s—scratch and c—concave.

In Table 1, defects are originally prioritized based on defect location. However a user may provide feedback that the size of the larger defects prioritizes them above and beyond location on the vehicle. This may change the prioritization, resulting in Table 2, which reprioritizes the set of defects based on size.

TABLE 2

| x | y | z | volume | type | initial order | reprioritized |
|---|---|---|--------|------|---------------|---------------|
| 43 | 132 | 601 | 0.1 | d | 1 | 2 |
| 92 | 207 | 105 | 0.01 | s | 2 | 3 |
| 218 | 386 | 385 | 0.12 | c | 3 | 1 |
| ... | ... | ... | ... | ... | | |

Example 3: Defect Prioritization Table

Not all defects require repair. Part of a prioritization scheme includes reviewing defects and removing those that do not require repair. FIG. 12A illustrates a sample output of detected defects returned in a look-up table. The array includes, from left to right, sample ID, x,y,z coordinates, size of defects in millimeters, and defect classification.

Defects that are greater than or equal to 0.01 are removed. Additionally, defects in the 205,314,400 surface boundary are of high priority. The removed defects are not provided on the prioritized list of defects, as illustrated in FIG. 12B.

Example 4: Incorporating User Feedback

Figure 13A:
Figure 13B:
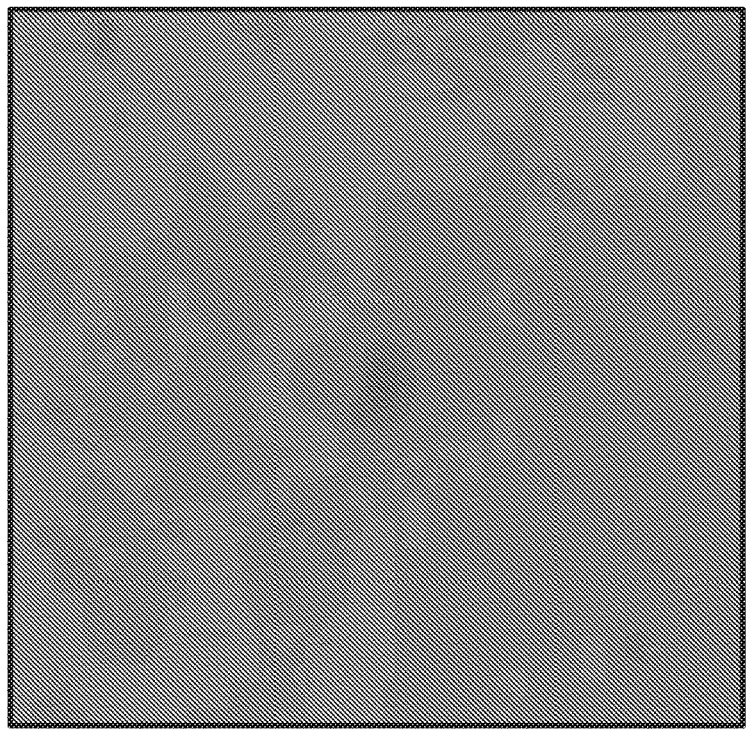

FIGS. 13A and 13B illustrate an example of how user feedback is incorporated into prioritizing defects for repair. FIG. 13A illustrates an initial list of defects and FIG. 13B illustrates the prioritized list of defects. User feedback was input that 'd' classified defects were to be deprioritized for the paint and defect location for a given vehicle. Defects with ID numbers 4 and 6 were also indicated as needing to be prioritized based on in-person review of the defects.

Example 5: Repair on Site or Divert

Figures 14A, 14B:
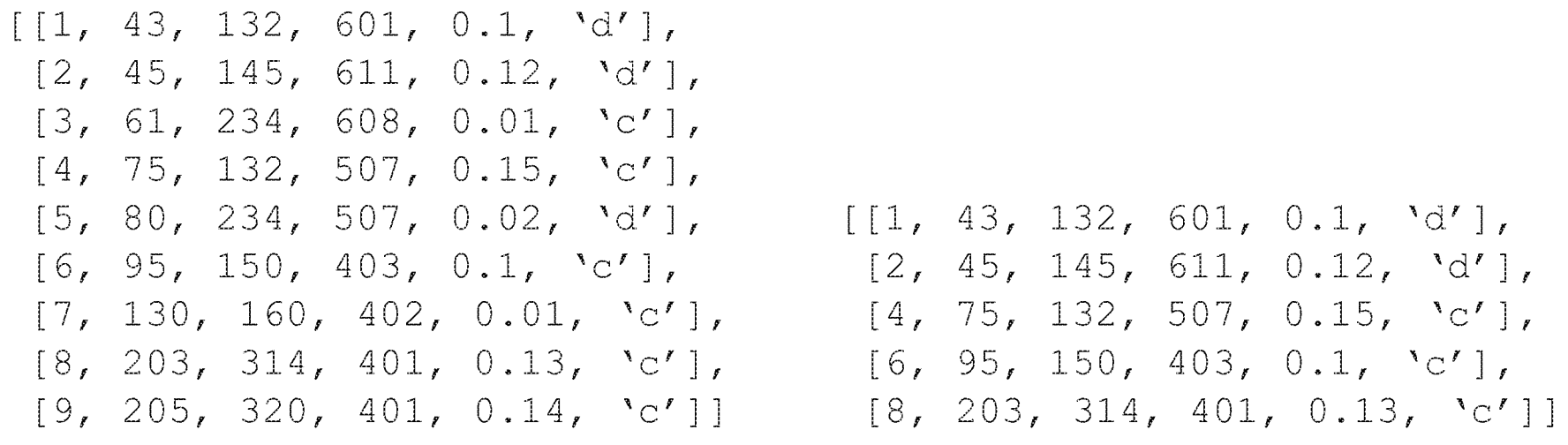
Figures 15A, 15B, 16:
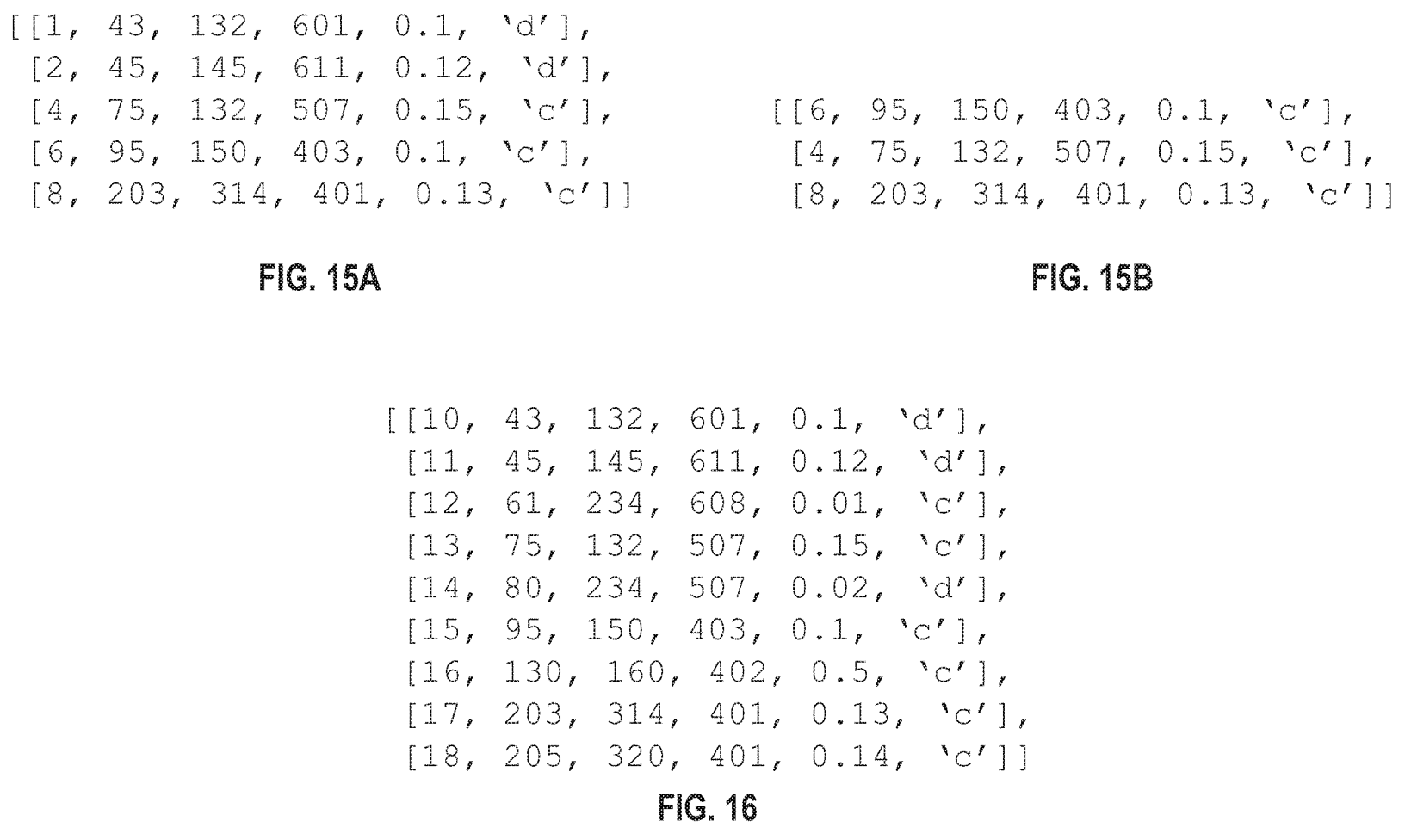

Making a determination early that a vehicle needs more extensive repair than can occur on an assembly line can save time in the long run. Prioritizing defects and detecting those that will cause the vehicle to need more extensive repair before a repair operation is started allows the assembly line to keep moving. FIGS. 14-16 illustrates portions of a set of defects for prioritization. The prioritization rules of Example 3 are applied to obtain the set of FIG. 14, but an additional prioritization is also present that automatically classifies a vehicle as needing to be diverted for repair if a defect with a size equal to or greater than 0.5 mm is detected. Since defect ID number 16 has such a size, the vehicle is diverted for repair.

What is claimed is:

1. A defect detection and ranking system for a vehicle assembly line, the defect detection and ranking system comprising:
    an image capture device that captures a plurality of images of a vehicle on the vehicle assembly line;
    a datastore containing a vehicle specification, for the vehicle on the vehicle assembly line, and a defect priority based on the vehicle specification;
    a defect detector that analyzes the plurality of captured images and, based on the analysis, detects a plurality of defects on a surface of the vehicle, wherein each the detect detector associates, for each of the plurality of defects, an x-y-z coordinate location, a defect type, and a defect severity;
    a defect prioritization generator configured to:
        receive the plurality of defects from the defect detector;
        retrieve the vehicle specification and the defect priority;
        apply the defect priority to the plurality of defects; and
        generate a prioritized list of defects; and
    wherein the defect prioritization generator outputs the prioritized list of defects to an output device associated with the vehicle assembly line.

2. The defect detection and ranking system of claim 1, wherein the defect type is one of a scratch, a dent or an excess paint and, wherein the plurality of defects includes a first defect with a first defect location, and a second defect with a second defect location, wherein the defect priority is a location of a defect, and wherein the first defect is prioritized higher than the second defect.

3. The defect detection and ranking system of claim 2, wherein the vehicle is a car, the first defect is located on a driver door of the car and the second defect is located on a roof of the car.

4. The defect detection and ranking system of claim 1, wherein the vehicle specification is a first vehicle color, wherein a defect type of one of the plurality of defects is a scratch, and wherein the defect priority for the scratch is higher for the first vehicle color than for a second vehicle color.

5. The defect detection and ranking system of claim 4, wherein the first color is black and the second color is silver.

6. The defect detection and ranking system of claim 1, wherein the defect prioritization generator also provides a repair recommendation with the prioritized list of defects, wherein the repair recommendation is either to repair the vehicle on-site or to divert the vehicle for repair.

7. The defect detection and ranking system of claim 6, wherein the repair recommendation also comprises an instruction to not repair a subset of the plurality of defects.

8. The defect detection and ranking system of claim 7, wherein the repair recommendation also comprises instructions for a repair robot to repair at least one defect, and wherein the instructions include a telemetry for the repair robot.

9. The defect detection and ranking system of claim 1, wherein the output device includes an input device configured to receive an indication of user feedback, wherein the indication of user feedback alters a position of a defect in the prioritized list of defects.

10. A computer-implemented method for ranking detected surface defects on a vehicle on an assembly line, the method comprising executing on a processor the steps of:
    receiving an identification of the vehicle;
    receiving, using a defect list retriever to access a defect database stored in a defect memory, a plurality of detected surface defects on the vehicle, wherein each of the plurality of detected surface defects has a defect location, a defect type, and a defect severity;
    automatically retrieving, based on the identification of the vehicle, using a specification retriever to access a specification database stored in a specification memory, a first vehicle specification and a second vehicle specification using a vehicle specification retriever;
    automatically retrieving, using a defect priority retriever to access a defect priority database stored in a priority memory, a first defect priority based on the first vehicle specification and a second defect priority based on the second vehicle specification;
    generating a defect priority list, using a defect prioritization generator, by applying the first defect priority and the second defect priority to the plurality of defects, wherein the defect priority list comprises a ranking of the plurality of detected surface such that a first of the plurality of defects is ranked higher than a second of the plurality of defects based on applying the first and second defect priorities to the defect location, defect type and defect severity;
    providing the defect priority list as an output to an output device associated with the assembly line; and
    wherein the steps of receiving an identification, receiving a plurality of detected surface defects, retrieving vehicle specifications, generating a defect priority list and providing a defect priority list are performed by a non-transitory computer-readable storage medium comprising instructions that, when executed by at least one processor of a computing device, cause the at least one processor to perform the steps of the defect list retriever, the vehicle specification retriever, the defect priority list, and providing the defect priority list.

11. The method of claim 10, wherein the first and second vehicle specifications are selected from the group consisting of: a vehicle model, a vehicle color, a vehicle option, a vehicle destination, a vehicle paint type, a vehicle paint application, and wherein the first and second defect priority are selected from the group consisting of: defect location priority, defect classification priority, vehicle color priority, vehicle grade priority, and relative defect position priority.

12. The method of claim 10, and further comprising:
imaging the vehicle, wherein imaging comprises capturing a plurality of images using a camera and stitching the plurality of images together using a processor; and
detecting the plurality of surface defects on the vehicle, wherein detecting comprises the processor analyzing the stitched images for potential defects, and wherein the defect detection processor identifies a defect feature, wherein the defect feature comprises the defect location and the defect type for each detected surface defect.

13. The method of claim 10, and wherein the output device also has an input device configured to receive user feedback for the defect priority list, wherein the user feedback is automatically associated with the first and second defect priorities.

14. A vehicle repair prioritization system for an assembly line, the system comprising:
a vehicle specification database comprising specifications for a vehicle on the assembly line, the database comprising a first specification and a second specification, wherein the first specification is a vehicle color indication for the vehicle;
a defect database comprising a list of detected defects for the vehicle, wherein each detected defect has an associated defect location and defect type; and
a non-transitory computer-readable medium with instructions stored thereon, that when executed by a processor, is configured to:
retrieve the first and second specifications;
retrieve a first priority, based on the first specification, and a second priority, based on the second specification, wherein the first priority is a color priority;
retrieve the list of detected defects;
generate a prioritized list of defects by apply the first and second priority to each defect on the list of defects to determine a priority of defects to be repaired; and
output the prioritized list of defects to an output device associated with the assembly line.

15. The system of claim 14, wherein the system is a networked system that comprises a repair system in communication with the vehicle repair prioritization system.

16. The system of claim 15, wherein the repair system comprises a repair lineage database that stores indicia of previously repaired defects, wherein indicia comprises at least one of: pre-repair images, post-repair images, telemetry for robotic repair, and a type and amount of abrasive product applied.

17. The system of claim 14, wherein the processor automatically retrieves the specifications, retrieves the detected defects and generates a prioritized list of defects based on a received indication that the vehicle is ready for repair.

18. The system of claim 17, wherein the indication is received from a sensor detecting the vehicle on assembly line.

19. The system of claim 14, wherein the processor is also configured to output a repair recommendation for the vehicle, wherein the repair recommendation is either to repair the vehicle on the assembly line or divert the vehicle for repair.

20. The system of claim 19, wherein the repair recommendation is communicated to a repair robot, which executes the repair recommendation, and wherein the repair recommendation comprises a repair telemetry based on a previous repair history for a similar defect.

* * * * *